US012139048B2

(12) United States Patent
Simms et al.

(10) Patent No.: US 12,139,048 B2
(45) Date of Patent: Nov. 12, 2024

(54) SEAT RAIL ASSEMBLY

(71) Applicant: TS TECH CO., LTD., Asaka (JP)

(72) Inventors: Andrew Simms, Royal Oak, MI (US); Dean Vandenheede, Franklin, MI (US); Justin Schrand, Ferndale, MI (US)

(73) Assignee: TS TECH CO., LTD., Asaka (JP)

( * ) Notice: Subject to any disclaimer, the term of this patent is extended or adjusted under 35 U.S.C. 154(b) by 359 days.

(21) Appl. No.: 17/702,140

(22) Filed: Mar. 23, 2022

(65) Prior Publication Data

US 2022/0388430 A1    Dec. 8, 2022

Related U.S. Application Data

(63) Continuation of application No. 17/762,789, filed as application No. PCT/IB2021/000755 on Nov. 1, 2021.

(60) Provisional application No. 63/107,840, filed on Oct. 30, 2020, provisional application No. 63/107,811, filed on Oct. 30, 2020, provisional application No. 63/107,822, filed on Oct. 30, 2020.

(51) Int. Cl.
*B60N 2/08* (2006.01)
*B60N 2/06* (2006.01)
*B60N 2/07* (2006.01)

(52) U.S. Cl.
CPC ........... *B60N 2/0705* (2013.01); *B60N 2/067* (2013.01); *B60N 2205/20* (2013.01)

(58) Field of Classification Search
CPC .. B60N 2/0705; B60N 2/02253; B60N 2/067; B60N 2205/20; B60N 2/0715
See application file for complete search history.

(56) References Cited

U.S. PATENT DOCUMENTS

| 5,273,242 A * | 12/1993 | Mouri | B60N 2/067 248/429 |
| 6,820,851 B2 * | 11/2004 | Mochizuki | B60N 2/067 248/429 |
| 7,048,244 B2 * | 5/2006 | Hauck | B60N 2/073 248/430 |
| 9,987,951 B2 * | 6/2018 | Bonk | B60N 2/0843 |

(Continued)

FOREIGN PATENT DOCUMENTS

| JP | H0518954 | 9/1993 |
| JP | H10100752 | 4/1998 |

(Continued)

OTHER PUBLICATIONS

PCT International Search Report and Written Opinion for corresponding PCT Application No. PCT/IB2021/000755, mailed on Mar. 8, 2022, 6 pages.

*Primary Examiner* — Amy J. Sterling
(74) *Attorney, Agent, or Firm* — Dority & Manning, P.A.

(57) ABSTRACT

A seat rail assembly capable of stably holding a position of one or more vehicle seats relative to the vehicle floor. The seat rail assembly includes an upper rail on which the seat is provided and a lower rail which is mounted to the vehicle floor. The upper rail is slidably provided within the lower rail, and incorporates an engagement assembly with a dual wedge engagement assembly to ensure constant contact between the lower and upper rails. A gearbox configured to remove lash may be provided on the upper rail for moving the upper rail relative to the lower rail.

14 Claims, 31 Drawing Sheets

(56) References Cited

U.S. PATENT DOCUMENTS

2016/0039314 A1* 2/2016 Anticuar .............. B60N 2/0715
                                                           248/429
2022/0281359 A1* 9/2022 Umezaki .............. B60N 2/0705

FOREIGN PATENT DOCUMENTS

| JP | 2004291914 | 10/2004 |
|----|------------|---------|
| JP | 2020026156 | 2/2020 |
| WO | WO2012090963 | 7/2012 |
| WO | WO2020141600 | 7/2020 |

* cited by examiner

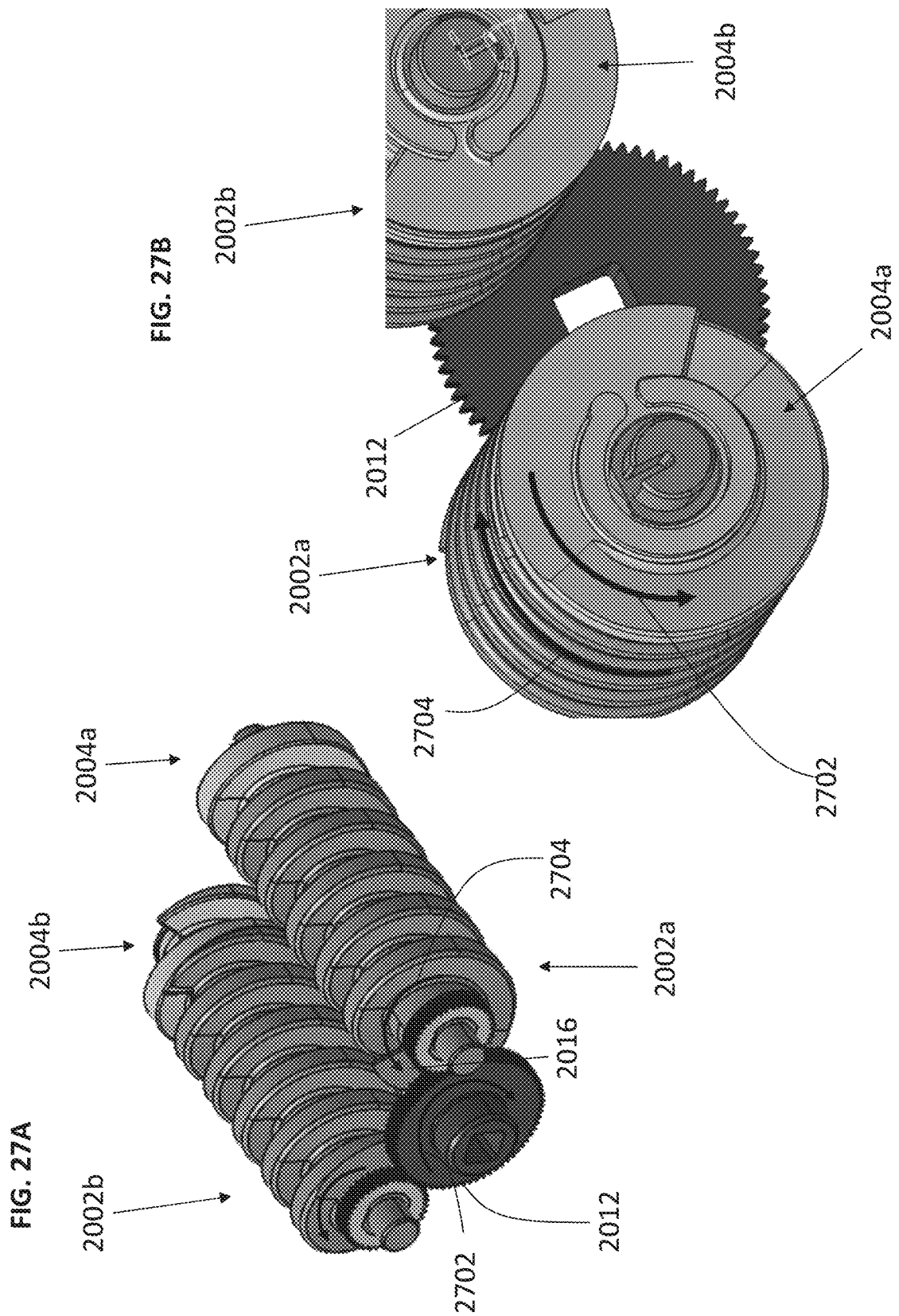

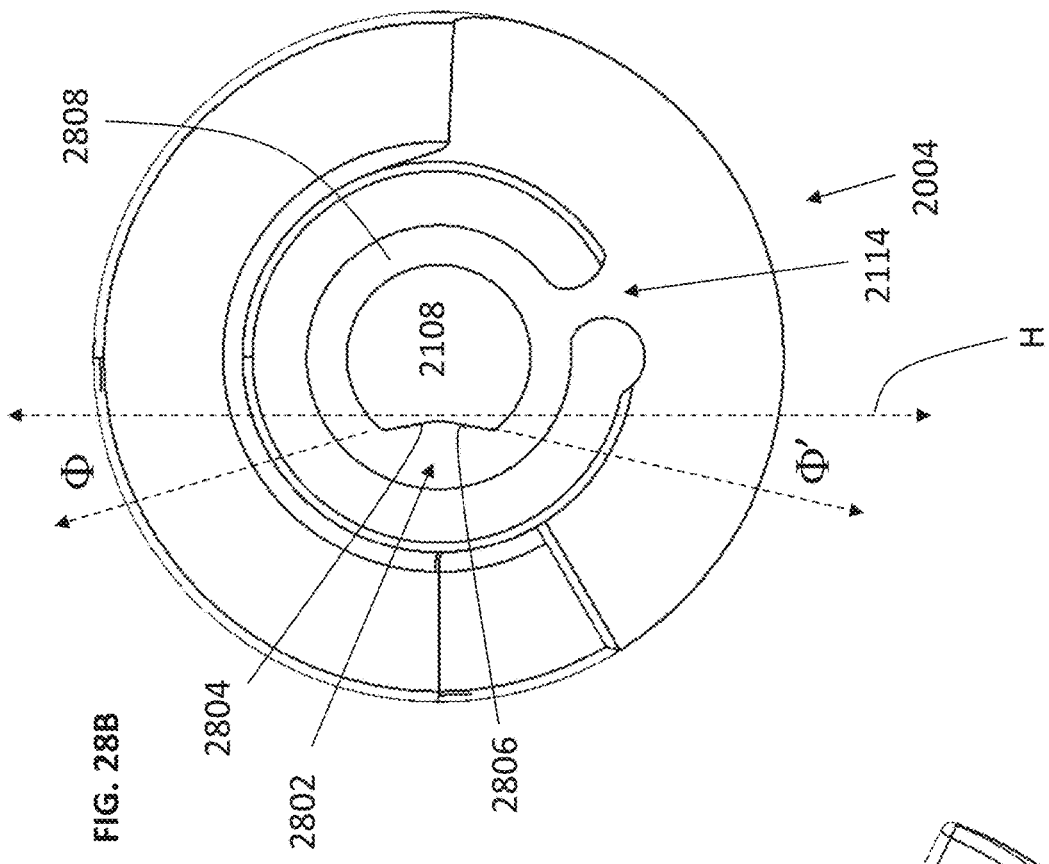
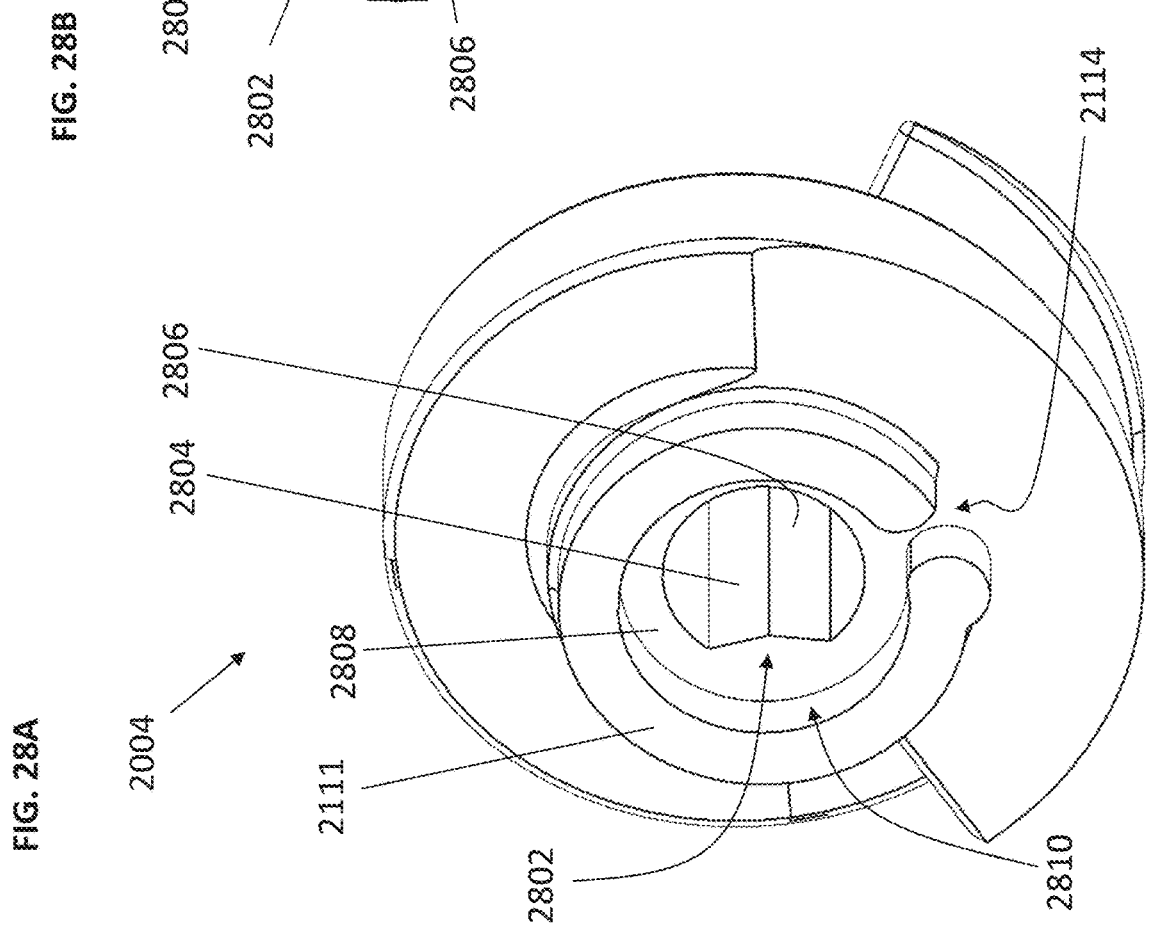
FIG. 28B
FIG. 28A

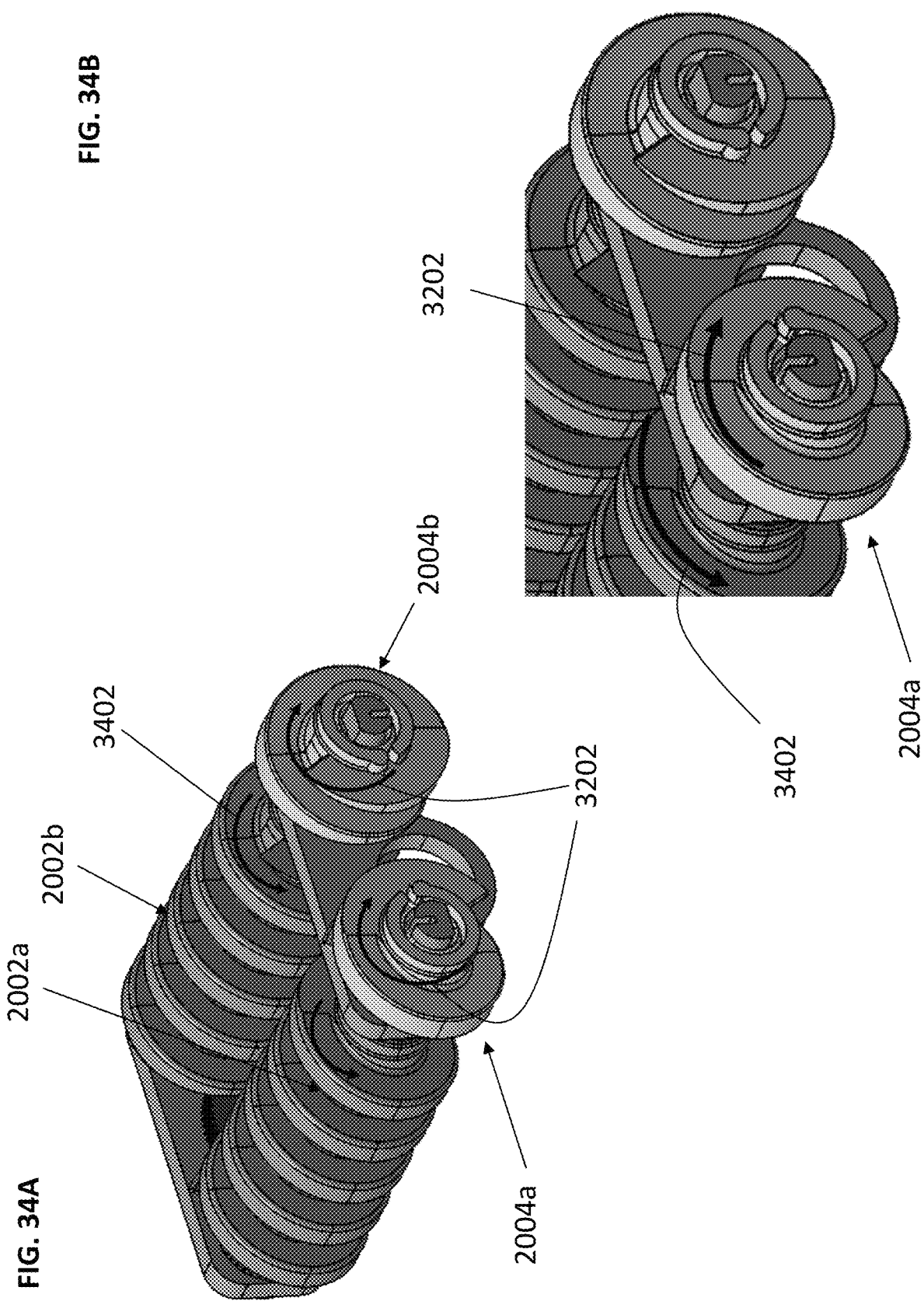

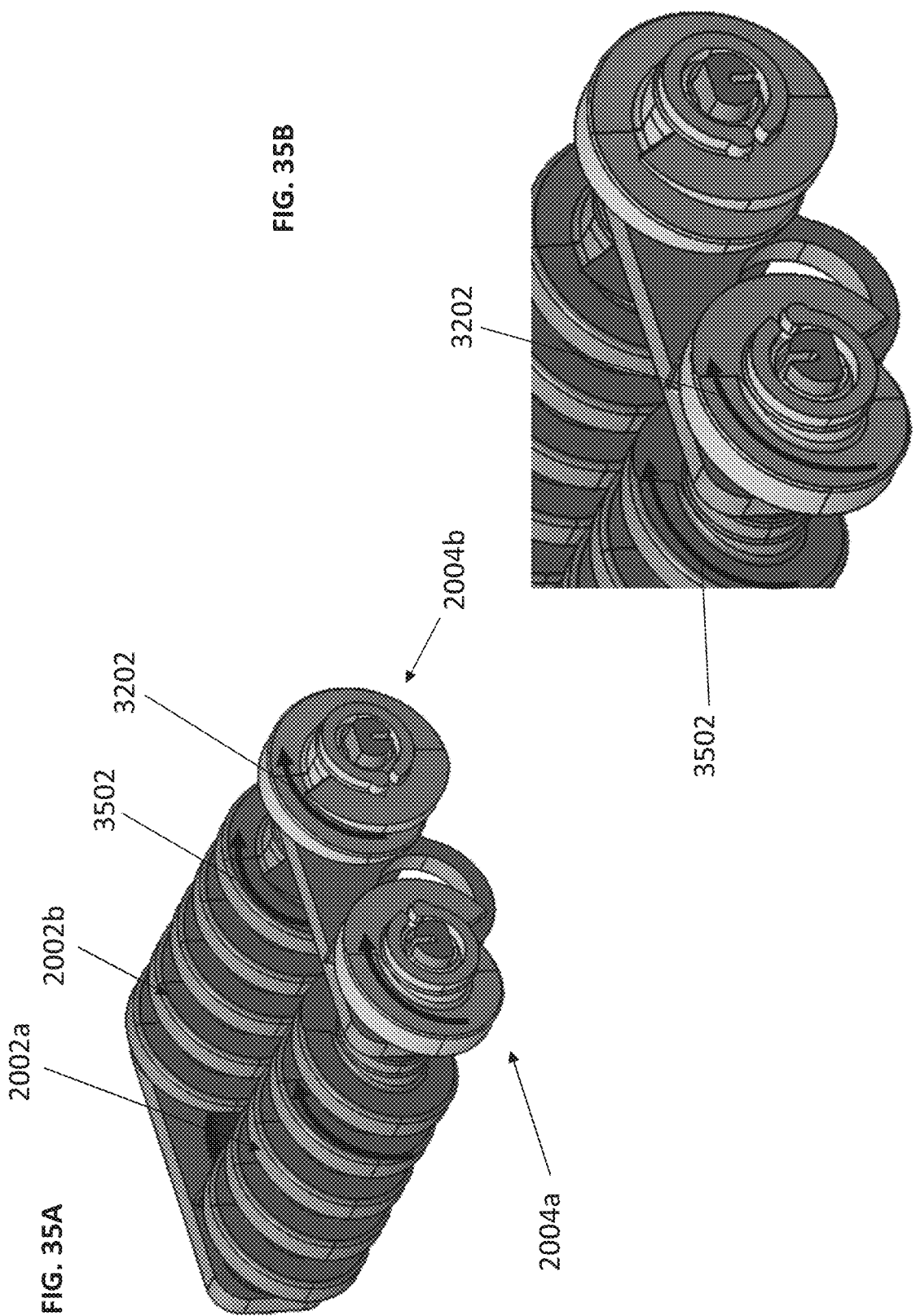

SEAT RAIL ASSEMBLY

CROSS-REFERENCE TO RELATED APPLICATIONS

This application is a continuation of U.S. patent application Ser. No. 17/762,789 filed on Mar. 23, 2022, which is the U.S. National Stage entry of International Application No. PCT/IB2021/000755 filed under the Patent Cooperation Treaty on Nov. 1, 2021, which claims priority to and the benefit of U.S. Provisional Patent Application No. 63/107,811 filed 30 Oct. 2020, U.S. Provisional Patent Application No. 63/107,822 filed 30 Oct. 2020, and U.S. Provisional Patent Application No. 63/107,840 filed 30 Oct. 2020, all of which are incorporated by reference herein in their entirety.

BACKGROUND

Seat rail assemblies are incorporated into vehicles for movably mounting passenger seats to the vehicle floor. Seat rail assemblies typically include a lower rail mounted to a floor and an upper rail on which the passenger seat is mounted. The upper rail is slideably connected to the lower rail such that the passenger seat may slide forward or rearward. Operation of the vehicle, however, may result in vibration that is transmitted into the seat rail assembly and thereby result in rattling between the lower and upper rails. Moreover, manufacture of the lower and upper rails, especially in the case of manufacturing longer rails, may result in variation or undulation along the length of the rail. Such variation and undulation may make it difficult for existing assemblies to maintain constant contact between the lower and upper rails when encountering such variation or undulation, which may also result in rattling. This rattling is undesirable and may even constitute unacceptable performance.

To inhibit such rattling, existing seat rail assemblies may incorporate slider assemblies which couple the upper rail to the lower rail. Existing slider assemblies, however, may result in too much or too little sliding resistance or uneven sliding resistance when sliding forward and/or rearward. To effectuate proper sliding resistance, existing slider assemblies do not maintain constant contact between the lower and upper rails, which may nevertheless result in undesirable rattling. Accordingly, an improved seat slide assembly is needed.

SUMMARY

Disclosed herein is a seat rail assembly for mounting a vehicle seat. In some embodiments, the seat rail assembly comprises a lower rail configured to be mounted to a vehicle floor, the lower rail defining a sliding space; an upper rail configured to receive a vehicle seat mounted thereon, the upper rail at least partially provided within the sliding space of the lower rail and slidable relative to the lower rail in a first direction or in a second direction opposite the first direction; an engagement assembly provided within the sliding space of the lower rail, the engagement assembly comprising a lower engagement member and an upper engagement member that are configured to move independently of each other depending on movement of the upper rail relative to the lower rail, the lower engagement member slidably provided on the upper rail, the upper engagement member slidably provided on the lower engagement member and slidable between a first position and a second position; wherein the lower engagement member is biased in the first direction and the upper engagement member is biased in the second direction towards the first position; and wherein, as the upper rail slides in the first and second directions relative to the lower rail, the upper engagement member maintains contact with the lower rail and the lower engagement member maintains contact with the upper rail.

In further embodiments, a surface of the upper engagement member maintains contact with a surface of the lower rail and a surface of the lower engagement member maintains contact with a surface of the upper rail. In even further embodiments, the surface of the upper rail is an inclined surface, and the lower engagement member is slidably provided on the inclined surface. In other further embodiments, the surface of the upper engagement member is a side surface of the upper engagement member, and the surface of the lower engagement member is a side surface of the lower engagement member. In other further embodiments, the surface of the upper engagement member is an upper surface of the upper engagement member, and the surface of the lower engagement member is a lower surface of the lower engagement member. In other further embodiments, the surface of the lower rail is an interior surface of the lower rail, and the surface of the upper rail is an exterior surface of the upper rail. In other further embodiments, the surface of the lower rail is an exterior surface of the lower rail, and the surface of the upper rail is an interior surface of the upper rail. In even further embodiments, the upper surface of the upper engagement member maintains contact with an interior surface of the lower rail and the lower surface of the lower engagement member maintains contact with a surface of the upper rail. In some embodiments, a track is formed on the lower engagement member, and wherein the upper engagement member is configured to engage the track when sliding on the lower engagement member. In even further embodiments, the track has a slope of opposite sign than a slope of an inclined surface of the upper rail, and in even further embodiments, the slope of the track and the slope of the inclined surface are of the same magnitude. In some embodiments, a height of the engagement assembly measured between the upper surface of the upper engagement member and the lower surface of the lower engagement member is greatest when the upper engagement member is in the first position. In some embodiments, the lower engagement member is biased in the first direction via an extension spring, and in even further embodiments, a first end of the extension spring is attached to the upper rail and a second end of the extension spring is attached to the lower engagement member. In some embodiments, the upper engagement member is biased in the second direction via a torsion spring, and in even further embodiments, a first end of the torsion spring is attached to the upper engagement member and a second end of the torsion spring is attached to the lower engagement member. In even further embodiments, the torsion spring inhibits travel of the upper engagement member on the lower engagement member beyond the second position. In some embodiments, the lower engagement member includes a stop that inhibits travel of the upper engagement member on the lower engagement member beyond the second position. In some embodiments, the lower engagement member includes a stop that inhibits travel of the upper engagement member on the lower engagement member beyond the first position.

In some embodiments, the upper rail has a first end and a second end opposite the first end, and wherein the engagement assembly includes a first and second engagement assembly, the first engagement assembly being provided within the sliding space of the lower rail proximate to the first end of the upper rail and the second engagement assembly being provided within the sliding space of the lower rail proximate to the second end of the upper rail, and wherein the lower engagement member of the first engagement assembly maintains contact with a first surface of the upper rail and the lower engagement member of the second engagement assembly maintains contact with a second surface of the upper rail. In further embodiments, the first surface of the upper rail is a first inclined surface and the second surface of the upper rail is a second inclined surface, and the lower engagement member of the first engagement assembly is slidably provided on the first inclined surface and the lower engagement member of the second engagement assembly is slidably provided on the second inclined surface. In even further embodiments, the first inclined surface has a slope of opposite sign than a slope of the second inclined surface, and in even further embodiments, the slope of the first inclined surface and the slope of the second inclined surface are of the same magnitude.

In some embodiments, the seat rail assembly further comprises a member for controlling lateral displacement of the upper rail and the lower rail relative to each other. In some of these embodiments, the member is supported by the upper rail. In even further embodiments, the member maintains contact with both the upper rail and the lower rail, and in some embodiments, the member comprises one or more ribs that abut the lower rail.

Embodiments herein are also directed towards a seat rail assembly comprising: a first rail configured to be mounted to a vehicle floor, the first rail defining a sliding space; a second rail configured to receive a vehicle seat mounted thereon, the second rail at least partially provided within the sliding space of the first rail and slidable relative to the first rail in a first direction or in a second direction opposite the first direction; an engagement assembly provided between the first rail and the second rail, the engagement assembly comprising a first surface and a second surface that are configured to move independently of each other depending on movement of the second rail relative to the first rail, the first surface slidably provided on a slide surface of the second rail, the second surface slidable between a first position and a second position; wherein the first surface of the engagement assembly is biased in the first direction and the second surface of the engagement assembly is biased in the second direction towards the first position; wherein, as the second rail slides relative to the first rail, the second surface of the engagement assembly maintains contact with an interior surface of the first rail and the first surface of the engagement assembly maintains contact with the slide surface of the second rail; and wherein a height of the engagement assembly measured between the second surface of the engagement assembly and the first surface of the engagement assembly is greatest when the second surface of the engagement assembly is in the first extreme position. In some embodiments, the slide surface of the second rail is an inclined surface, and the first surface of the engagement assembly is slidably provided on the inclined surface. In some embodiments, the engagement assembly further comprises a first engagement member and a second engagement member, and wherein the first surface of the engagement assembly is a surface of the first engagement member and the second surface of the engagement assembly is a surface of the second engagement member.

Embodiments herein are also directed towards a seat rail assembly for mounting a vehicle seat to a vehicle floor, comprising: a first rail configured to be mounted to a vehicle floor, the first rail defining a sliding space; a second rail configured to receive a vehicle seat mounted thereon, the second rail at least partially provided within the sliding space of the first rail and slidable relative to the first rail in a first direction or in a second direction opposite the first direction, the second rail having a first end and a second end which correspond with the first direction and the second direction, respectively; a first engagement assembly and a second engagement assembly each provided between the first rail and the second rail, the first engagement assembly positioned proximate the first end of the second rail and the second engagement assembly positioned proximate the second end of the second rail, the first and second engagement assembly each comprising a first engagement member and an second engagement member that are configured to move independently of each other depending on movement of the second rail relative to the lower rail, the first engagement member slidably provided on the second rail, the second engagement member slidably provided on the first engagement member and slidable between a first position and a second position; wherein, as the second rail slides relative to the first rail, the second engagement member maintains contact with the first rail and the first engagement member maintains contact with the second rail. In some embodiments, the first engagement member of the first engagement assembly is biased in the first direction and the second engagement member of the first engagement assembly is biased in the second direction towards the first position, and wherein the first engagement member of the second engagement assembly is biased in the second direction and the second engagement member of the second engagement assembly is biased in the first direction towards the first position. In some embodiments, the first engagement member of the first engagement assembly is biased in the first direction and the second engagement member of the first engagement assembly is biased in the second direction towards the first position, and wherein the first engagement member of the second engagement assembly is biased in the first direction and the second engagement member of the second engagement assembly is biased in the second direction towards the first position.

Embodiments herein are also directed towards mounting assembly for mounting a vehicle seat to a vehicle floor. In such embodiments, the mounting assembly may comprise a first seat rail assembly as variously described above, and a second seat rail assembly as variously described above.

Embodiments herein are also directed towards a method of assembling a vehicle seat rail assembly. The method may comprise providing a first rail having a slide surface, the first rail have a first end and a second end opposite the first end; providing a first engagement member on the slide surface of the first rail, the first engagement member having first surface that abuts on and is slidable on the slide surface of the first rail, connecting the first engagement member to the first rail with a first spring such that the first engagement member is biased towards the first end; providing a second engagement member on a second surface of the first engagement member, the second engagement member having first surface that abuts on and is slidable on the second surface of the first engagement member, and connecting the second engagement member to the first engagement member or the first rail with a second spring such that the second engagement member is biased towards the second end. In some embodiments, the method further comprises installing the first rail into a second rail, wherein the second rail has a slide surface, and wherein the second engagement member has a second surface that abuts on and is slidable on the slide surface of the second rail. In further embodiments, as the first rail slides in a first direction and opposite second direction relative to the second rail, the second engagement member maintains contact with the second rail and the first engagement member maintains contact with the first rail; and in even further embodiments, the method further comprises mounting the second rail to a floor of a vehicle and/or mounting a vehicle seat to the first rail.

Embodiments herein are also directed towards a method of assembling a seat rail assembly. The method may comprise providing lower rail which defines a sliding space; providing an upper rail at least partially within the sliding space of the lower rail and slidable relative to the lower rail in a first direction or in a second direction opposite the first direction; and installing an engagement assembly between the lower rail and the upper rail, the engagement assembly comprising a lower engagement member and an upper engagement member that are configured to move independently of each other depending on movement of the upper rail relative to the lower rail, the lower engagement member slidably provided on the upper rail, the upper engagement member slidably provided on the lower engagement member and slidable between a first position and a second position, wherein the lower engagement member is biased in the first direction and the upper engagement member is biased in the second direction towards the first extreme position, and wherein, as the upper rail slides in the first and second directions relative to the lower rail, the upper engagement member maintains contact with the lower rail and the lower engagement member maintains contact with the upper rail. In some embodiments, an upper surface of the upper engagement member maintains contact with an interior surface of the lower rail and a lower surface of the lower engagement member maintains contact with a surface of the upper rail. In further embodiments, the surface of the upper rail is an inclined surface, and the lower engagement member is slidably provided on the inclined surface. In some embodiments, the method further comprises mounting the lower rail to a floor of a vehicle and/or mounting a vehicle seat to the upper rail.

The present disclosure is also directed towards a seat rail assembly comprising a first rail having longitudinally spaced slots; and a second rail having a gear box. In these embodiments, the gear box may comprise at least one drive screw rotatable in a first or second rotational direction, each drive screw having a shaft and a thread configured to engage with the longitudinally spaced slots of the first rail; a lobe provided on the shaft of the drive screw proximate an end of the thread and configured to engage with the longitudinally spaced slots of the first rail, wherein the lobe is freely rotatable relative to the thread of the drive screw; and a lobe spring configured to bias the lobe in the first rotational direction. In some embodiments, the first rail defines a sliding space between the longitudinally spaced slots. In even further embodiments, the second rail is at least partially providing within the sliding space of the first rail. In some embodiments, the lobe has a limited range of rotation about the shaft. In some embodiments, the lobe includes a thread that is continuous with the thread of the drive screw. In some embodiments, the lobe includes a thread, and the thread of the lobe and the thread of the drive screw have an equal pitch. In some embodiments, the lobe has a bore within which the shaft of the drive screw is received, the shaft of the drive screw includes a flat feature, and a pair of angled flat surfaces are formed in the bore of the lobe and wherein the lobe is rotatable relative to the shaft between a first position, where a first of the pair of angled flat surfaces abuts the flat feature, and a second position, where a second of the pair of angled flat surfaces abuts the flat feature.

In some embodiments, the second rail includes a second gear box. In these embodiments, the second gear box may comprise at least one drive screw rotatable in a first or second rotational direction, each drive screw having a shaft and a thread configured to engage with the longitudinally spaced slots of the first rail; a lobe provided on the shaft of the drive screw proximate an end of the thread and configured to engage with the longitudinally spaced slots of the first rail, wherein the lobe is freely rotatable relative to the thread of the drive screw; and a lobe spring configured to bias the lobe in the first rotational direction.

Embodiments herein are also directed towards a gear box for a rail assembly. The gear box may comprise at least one drive screw rotatable in a first or second rotational direction, each drive screw having a shaft and a thread configured to engage with longitudinally spaced slots of a rail; a lobe provided on the shaft of the drive screw proximate an end of the thread and configured to engage with the longitudinally spaced slots of the rail, wherein the lobe is freely rotatable relative to the thread of the drive screw; and a lobe spring configured to bias the lobe in the first rotational direction. In some embodiments, the rail defines a sliding space between the longitudinally spaced slots. In some embodiments, the gear box is at least partially providing within the sliding space of the rail. In some embodiments, the lobe has a limited range of rotation about the shaft. In some embodiments, the lobe includes a thread that is continuous with the thread of the drive screw. In some embodiments, the lobe includes a thread, and the thread of the lobe and the thread of the drive screw have an equal pitch. In some embodiments, the lobe has a bore within which the shaft of the drive screw is received, the shaft of the drive screw includes a flat feature, and a pair of angled flat surfaces are formed in the bore of the lobe and wherein the lobe is rotatable relative to the shaft between a first position, where a first of the pair of angled flat surfaces abuts the flat feature, and a second position, where a second of the pair of angled flat surfaces abuts the flat feature.

Embodiments herein are also directed towards a seat rail assembly for mounting a vehicle seat to a vehicle floor. The seat rail assembly may comprise a first rail configured to be mounted to a vehicle floor, the lower first rail having longitudinally spaced slots and defining a sliding space; a second rail configured to receive a vehicle seat mounted thereon, the second rail at least partially provided within the sliding space of the first rail and slidable relative to the lower rail in a first direction or in a second direction opposite the first direction; and a gear box provided on the second rail. In these embodiments, the gear box may comprise at least one drive screw rotatable in a first or second rotational direction, each drive screw having a shaft and a thread configured to engage with the longitudinally spaced slots of the first rail, a lobe provided on the shaft of the drive screw proximate an end of the thread and configured to engage with the longitudinally spaced slots of the first rail, wherein the lobe is freely rotatable relative to the thread of the drive screw, and a lobe spring configured to bias the lobe in the first rotational direction. Also in these embodiments, the seat rail assembly may comprise an engagement assembly provided within the sliding space of the first rail, the engagement assembly comprising a first engagement member and a second engagement member that are configured to move independently of each other depending on movement of the second rail relative to the first rail, the first engagement member slidably provided on the second rail, the second engagement member slidably provided on the first engagement member and slidable between a first position and a second position; wherein the first engagement member is biased in the first direction and the second engagement member is biased in the second direction towards the first position; and wherein, as the second rail slides relative to the first rail in response to operation of the gear box, the second engagement member maintains contact with the first rail and the first engagement member maintains contact with the second rail.

Embodiments herein are also directed towards a seat rail assembly for mounting a vehicle seat to a vehicle floor. The seat rail assembly may comprise a first rail configured to be mounted to a vehicle floor, the first rail defining a sliding space; a second rail configured to receive a vehicle seat mounted thereon, the second rail at least partially provided within the sliding space of the first rail and slidable relative to the first rail in a first direction or in a second direction opposite the first direction; an engagement assembly provided between the first rail and the second rail, the engagement assembly slidably provided on an inclined surface of the second rail; a linear biasing member connecting the engagement assembly to the second rail such that the engagement member is biased along the inclined surface of the second rail towards a first position; wherein, as the second rail slides relative to the first rail, the engagement assembly maintains contact with both an interior surface of the first rail and the inclined surface of the second rail.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIGS. 27A and 27B illustrate example operation of the gearbox's drive train to eliminate slop in the system.

FIGS. 28A and 28B illustrate an example of the lobe 2004, according to one or more embodiments of the present disclosure.

FIGS. 34A-34B and 35A-35B illustrate example operation of drive train within the gearbox 2900 to eliminate slop in the system.

DETAILED DESCRIPTION

The present disclosure is related to seat rail assemblies and, more particularly, to seat rail assemblies that support the position of a vehicle seat and permit easy maneuvering of the seat without rattling or undesired resistance.

Figure 1:
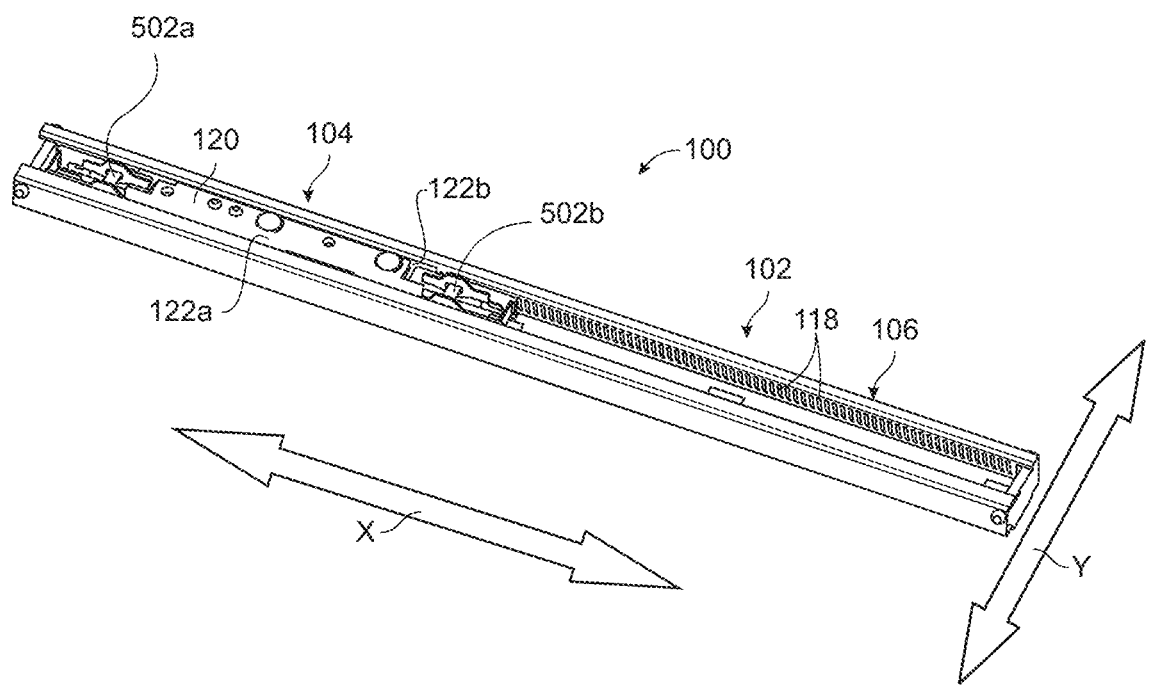
FIG. 1 is an isometric view of an example seat rail assembly according to one or more embodiments of the present disclosure.
Figure 2:
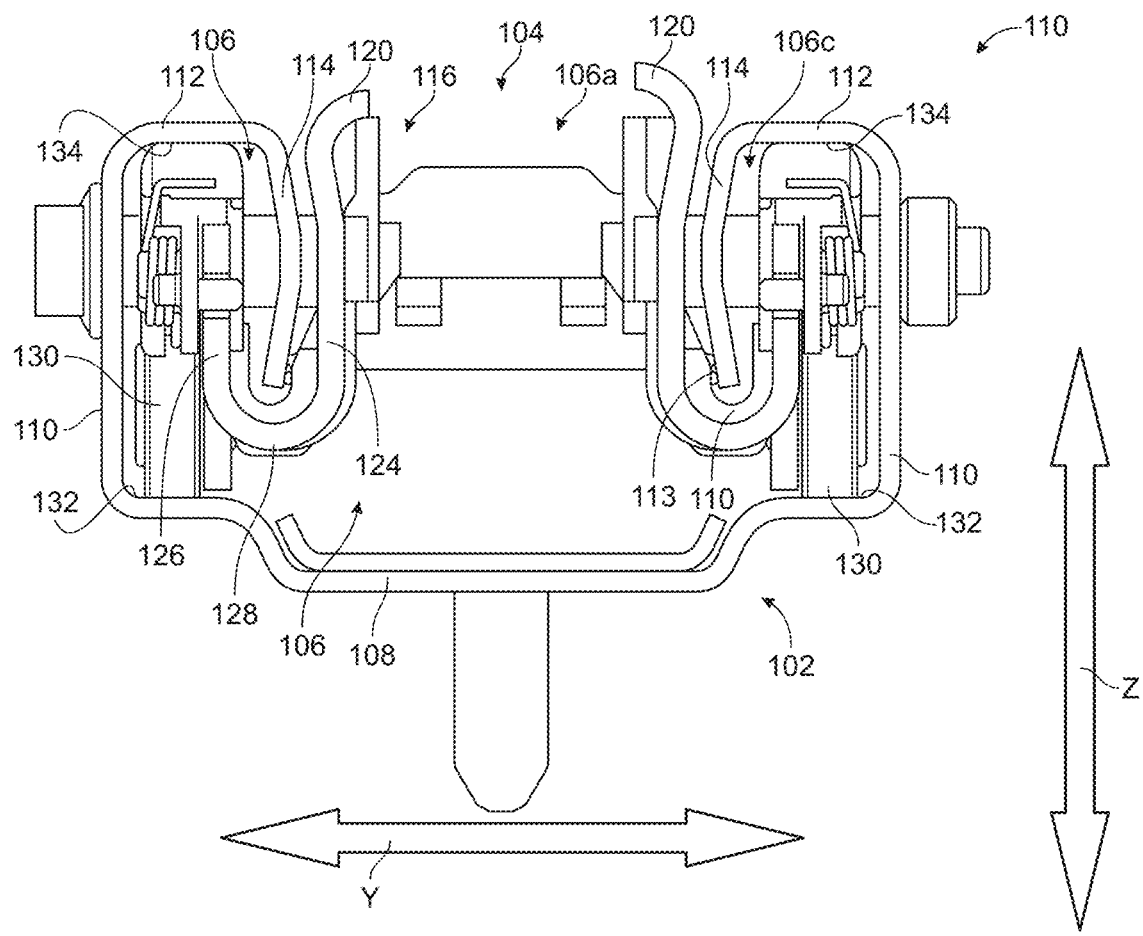
FIG. 2 is cross-sectional end view of the seat slide of FIG. 1.
Figure 3:
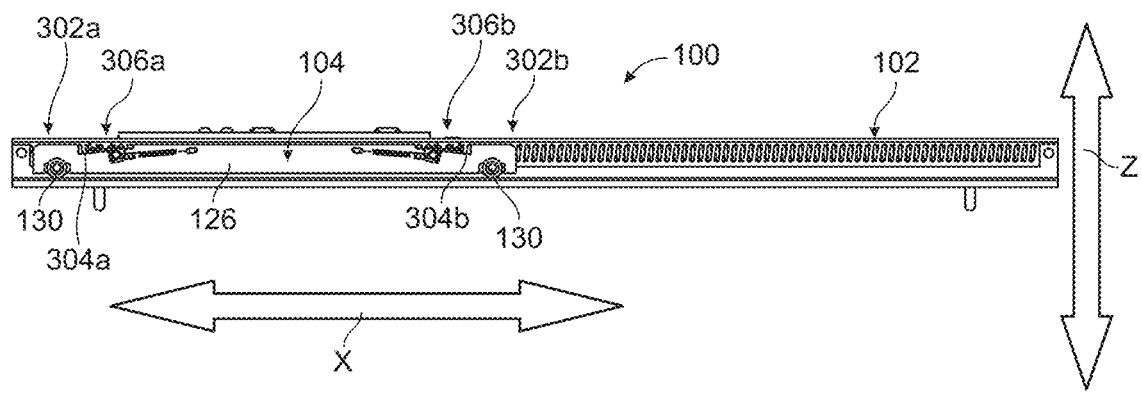
FIG. 3 is cross-sectional side view of the seat slide of FIG. 1.
Figure 4:
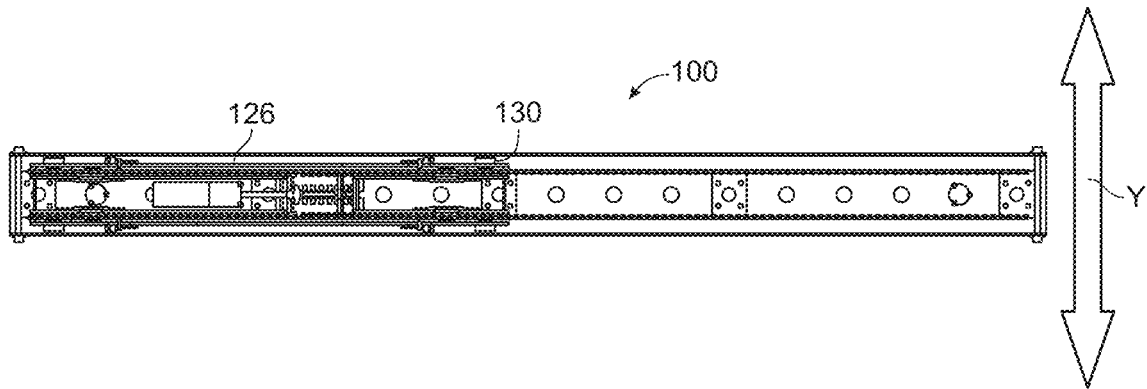
FIG. 4 is cross-sectional top view of the seat slide of FIG. 1.

FIG. 1 is an isometric view of an example seat rail assembly 100 according to one or more embodiments of the present disclosure. FIG. 2 is a cross-sectional end view of the seat rail assembly 100 of FIG. 1. FIG. 3 is cross-sectional side view of the seat rail assembly 100 of FIG. 1. FIG. 4 is cross-sectional top view of the seat rail assembly 100 of FIG. 1. The seat rail assembly 100 is just one example of a seat rail assembly that incorporates the principles of the present disclosure. Many alternative designs and configurations of the seat rail assembly 100 may be employed, without departing from the scope of this disclosure. The seat rail assembly 100 supports at least one vehicle seat (not illustrated) on a vehicle floor (not illustrated) in a manner permitting movement of the vehicle seat relative to the floor. Also, it should be appreciated that two (or more) of the seat rail assemblies 100 may be utilized to support a vehicle seat's left and right hand side (and possible middle region). For purposes of simplicity, one seat rail assembly 100 is illustrated and described, but it should be appreciated that any number of seat rail assemblies 100 may be utilized without departing from the present disclosure. Also, while the seat rail assembly 100 is described herein with regard to mounting a vehicle seat (or more than one seat) relative to a floor of a vehicle, the seat rail assembly 100 may be utilized to mount the vehicle seat to another surface of the vehicle, such as a ceiling or a sidewall. In addition, while the present subject matter is disclosed as a rail assembly for movably mounting a vehicle seat to a surface of a vehicle, the seat rail assembly 100 may be utilized to movably mount other objects relative to the vehicle surface, such as an ottoman, table, bench, entertainment equipment, etc. Moreover, while the seat rail assembly 100 is described as being utilized in automobile and vehicle applications, the present subject matter may be utilizable in other various other non-automotive applications where it is desirable to inhibit rattling between movable components. All such applications are considered within the scope of the present disclosure.

The seat rail assembly 100 includes a lower rail 102 and an upper rail 104. The lower rail 102 defines an internal cavity or sliding space 106 within which the upper rail 104 is slidingly provided. The upper rail 104 may slide relative to the lower rail 102 with or without an external source of power as described herein. Thus, the upper rail 104 is slidable relative to the lower rail 102 with either powered or unpowered movement. In this manner, the upper rail 104 is slidingly provided on the lower rail 102 such that the upper rail 104 may move (or slide) forward or rearward as indicated by the arrow X (i.e., the upper rail 104 may slide in a forward direction or an opposite rearward direction). For example, when installed in a vehicle, the lower rail 102 extends in the X direction, which is the vehicle seat's front and/or rear direction, and has a width in a Y direction. As described herein, the lower rail 102 may be mounted (i.e., placed or fixed in position) on a vehicle floor. Similarly, the vehicle seat may be mounted (i.e., placed or fixed in position) on the upper rail 104 as described herein.

Figure 5A:
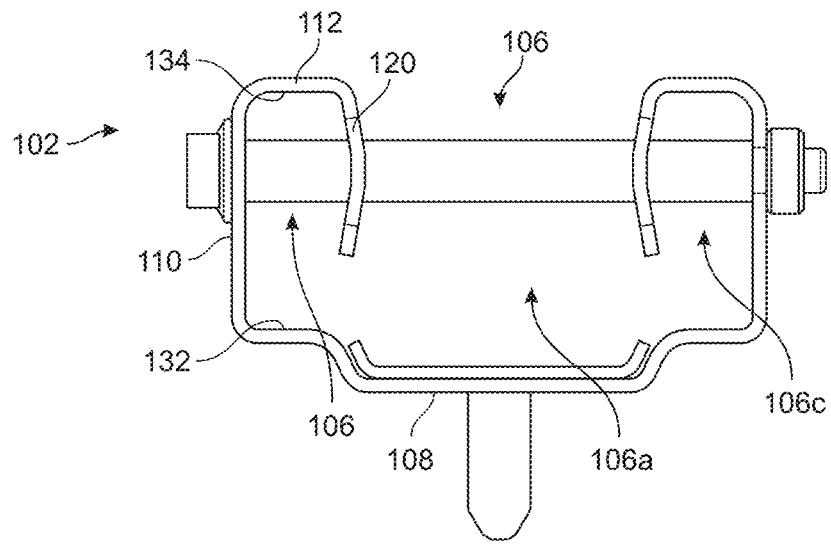
FIGS. 5A and 5B are views of the lower and upper rails, respectively.
Figure 5B:
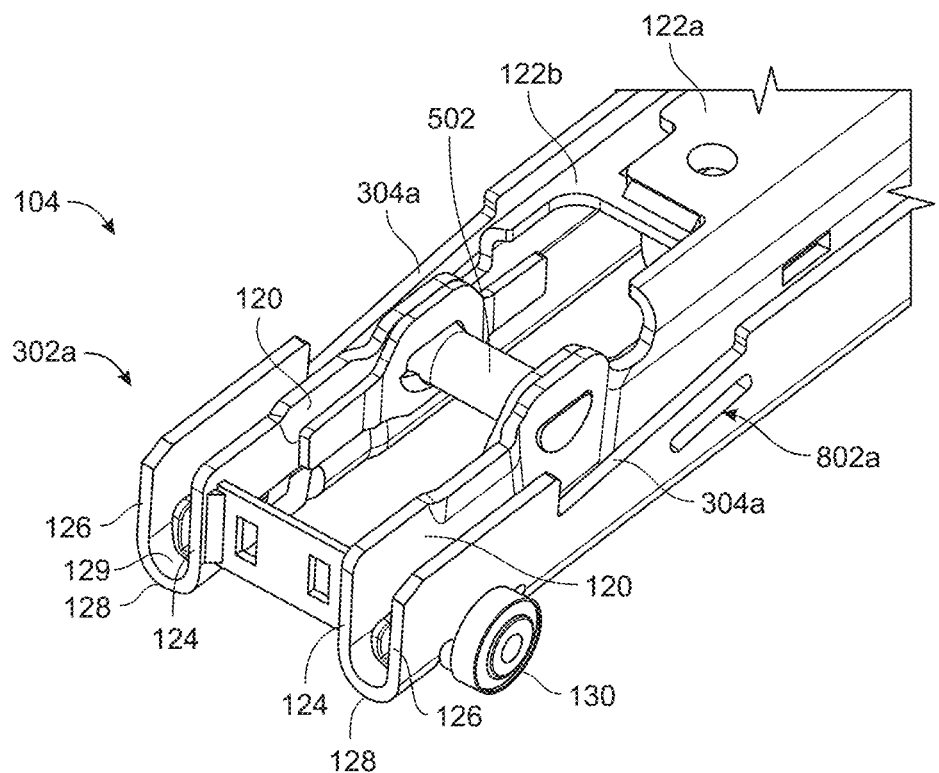

FIG. 5A illustrates a cross-sectional end view of the lower rail 102. FIG. 5B illustrates a partial perspective view of an end of the upper rail 104. The lower rail 102 has a bottom plate section 108, a pair of outer plate sections 110 extending upward from both right and left ends of the bottom plate section 108, upper plate sections 112 extending from upper ends of the right and left outer plate sections 110 to the inside in right-left direction Y, and inner plate sections 114 extending downward from inner ends of the right and left upper plate sections 112.

The lower rail 102 defines a sliding space 106. The sliding space 106 is a compartment within which at least a portion of the upper rail 104 may be received and slide within. The sliding space 106 is surrounded by the bottom plate section 108, the right and left outer plate sections 110, the right and left upper plate sections 112, and the right and left inner plate sections 114. The sliding space 106 receives a lower portion of the upper rail 104. The sliding space 106 opens upward from a space between the right and left inner plate sections 114. The upper rail 104 is mounted such that an upper section 116 of the upper rail 104 protrudes from a region opening between the right and left inner plate sections 114 of the lower rail 102. In addition, the sliding space 106 is compartmentalized and includes a central space 106a defined between the left and right inner plates 114, as well as a pair of left and right side spaces 106b,106c on either side of the central space 106a that are each defined between the outer plates 110 and the inner plates 114.

As illustrated in FIG. 1, a plurality of lock holes 118 are formed in one or both of the right and left inner plate sections 114. The lock holes 118 may be intermittently formed in the X direction and may be utilized to lock the position of the upper rail 104 relative to the lower rail 102.

The upper rail 104 includes a pair of side plates 120. As shown in FIGS. 1 and 5B, the pair of side plates 120 includes overlapping portions 122a,122b which extend in the X direction. The side plates 120 may be curved or segmented to at least partially wrap around the left and right inner plates 114 of the lower rail 102. In the illustrated example, the side plates 120 each are generally U-shaped when evaluated in cross-section and include a downwardly extending sidewall portion 124 and an upwardly extending sidewall portion 126 joined together by a bottom portion 128. The downwardly and upwardly extending sidewall portions 124,126 are spaced apart from each other in the Y dimension and the plate 114 may extend downward there-between. When assembled, the portions 124 of the side plates 120 may be positioned between the inner plates 114 of the lower rail 102 and within the central compartment 106a of the sliding space 106, and each of the sidewall portions 126 of the side plates 120 may be positioned within the left and right side spaces 106b,106c. In the illustrated example, a pair of spacers 502a,502b are utilized to laterally support the side plates 120 at the desired width.

Rollers 130 are provided on and supported by the upper rail 104. In the illustrated example, the rollers 130 are rotatably mounted to the upwardly extending sidewall portions 126. The rollers 130 roll on a top surface 132 of the bottom plate 108 of the lower rail 102 and thereby slidingly support the upper rail 104 relative to the lower rail 102. As described below, in some examples, the rollers 130 may be coupled to upper rail 104 via a slider member positioned on an inner surface 129 of the bottom portion 128 of the upper rail 104.

Referring to FIG. 3, the upper rail 104 may have at least one inclined surface 304. As illustrated, provided at opposite ends 302a,302b of the upper rail 104 are a pair of inclined surfaces 304a,304b. The inclined surfaces 304 are formed into the sidewall portion 126 of the upper rail 104. As described below, an engagement assembly 306 slidably abuts on each of the inclined surfaces 304. In particular, a pair of engagement assemblies 306a,306b slidably abut on a respective one of the inclined surfaces 304a,304b. Each of the engagement assemblies 306a,306b also abuts on an interior upper surface 134 (see FIG. 2) of the upper plate sections 112 of the lower rail 102. In this manner, the upper rail 104 is constrained within the sliding compartment 106 of the lower rail 102, between the bottom plate section 108 and the upper plate sections 112, via the rollers 130 and the engagement assemblies 306a,306b.

FIG. 5B illustrates an example of the upper rail 104 utilizable with the seat rail assembly of FIGS. 1-4. As shown, the inclined surfaces 304a,304b extend along the upper rail 104 in the X direction, and are each inclined or sloped upward in the Z direction as they approach each other (and are inclined or sloped downwards in the Z direction as they extend away from each other and toward their respective end 302a,302b). For example, as illustrated in FIG. 3, the inclined surface 304a proximate the left end 302a has a positive slope, whereas the inclined surface 304b proximate the right end 302b has a negative slope. Stated differently, the slopes of the inclined surfaces 304a,304b are of opposite sign (e.g., the inclined surface 304a may have a positive (+) value slope and the inclined surface 304b may have a negative (−) value slope, and vice versa). The inclined surfaces 304a,304b are inclined or sloped so as to approach lower surfaces 134 of the upper plate sections 112 of the lower rail 102. Moreover, regardless of whether the inclined surfaces 304a,304b have slopes of the same or different signs, the inclined surfaces 304a,304b may have slopes of equal magnitude (i.e., equal absolute value but opposite in sign, or they have slopes which are negative of each other). However, the inclined surfaces 304a,305b may have slopes of different magnitude. In addition, the inclined surfaces 304a,304b may have the same or different travel lengths. For example, the inclined surfaces 304a,304b may slope in the same direction (i.e., they may both be positive (+) or negative (−) value slope), and may extend in such same direction toward either the first end or the second end 302a,302b of the upper rail 104.

Figure 6A:
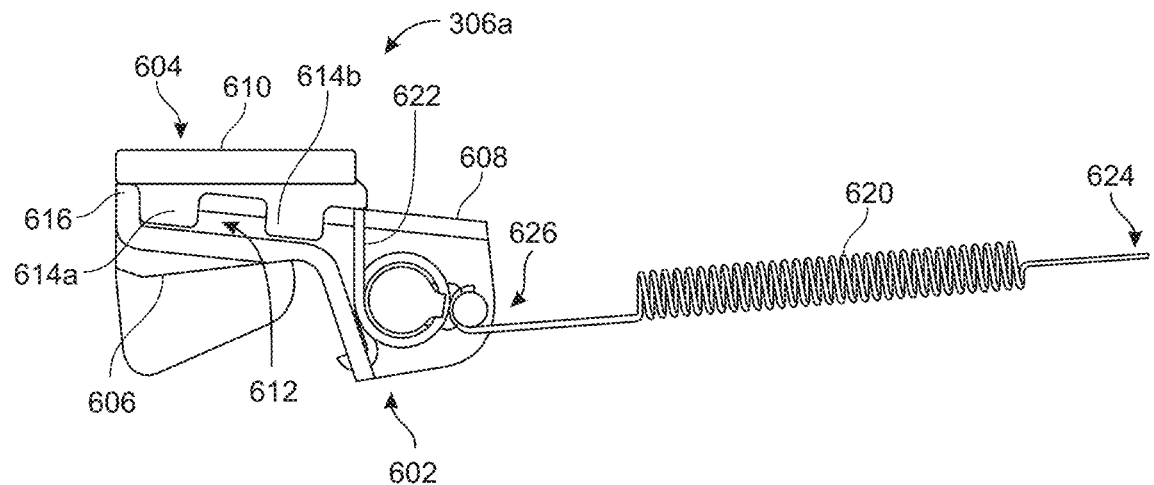
FIGS. 6A and 6B are side views of the engagement assembly of FIG. 3.
Figure 6B:
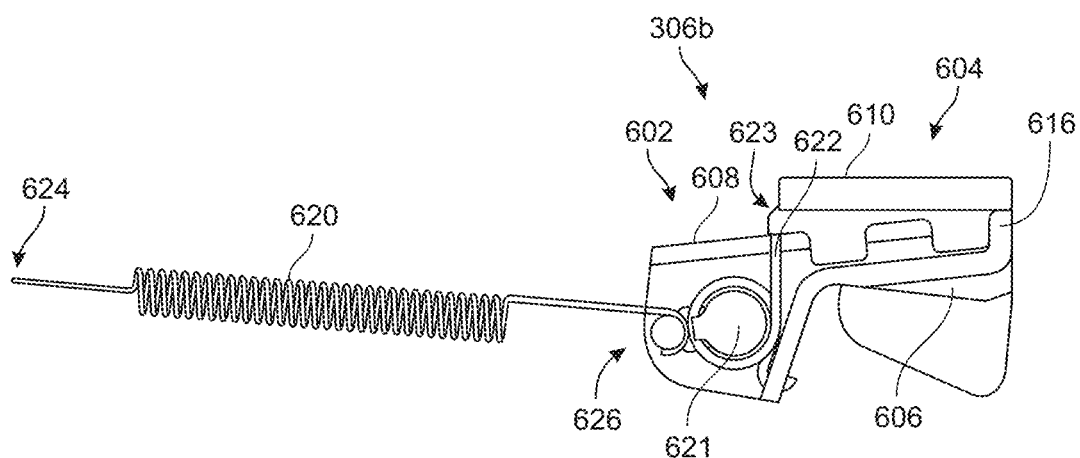

FIGS. 6A and 6B illustrate an example engagement assembly 306 featuring a dual wedge design, according to one or more embodiments of the present disclosure. In particular, FIG. 6A illustrates the left hand side engagement assembly 306a of FIG. 3, whereas FIG. 6B illustrates the right hand side engagement assembly 306b of FIG. 3. While being positioned at opposite ends 302a,302b of the upper rail 104, the pair of the engagement assemblies 306a,306b may be identical with each other. The engagement assemblies 306a,306b are positionable on the upper rail 104 within the left and right side spaces 106b,106c of the sliding space 106 defined by the lower rail 102. The engagement assemblies 306a,306b are slidable on the inclined surfaces 304a, 304b of the upper rail 104.

The engagement assemblies 306a,306b each includes a lower engagement member 602 and an upper engagement member 604. The lower and upper engagement members 602,604 are each configured as a wedge shaped member, such that the engagement assembly 306 incorporates a dual wedge design. The lower engagement member 602 includes a lower inclined surface 606 that abuts and is slidable on the inclined surfaces 304a,304b of the upper rail 104. Thus, the lower engagement member 602 is slidable on the upper rail 104. In addition, the lower engagement member 602 includes an upper inclined surface 608. The upper engagement member 604 includes a lower contact surface (obscured from view) that abuts on and is slidable on the upper inclined surface 608 of the lower engagement member 602. Thus, the upper engagement member 604 is slidable and movable on the upper inclined surface 608 of the lower engagement member 602. Also, the upper engagement member 604 includes an upper surface 610 that abuts and is slidable on the lower surfaces 134 of the upper plate sections 112 of the lower rail 102. In the illustrated example, an inclined or sloped channel or track 612 is defined in the lower engagement member 602 and the upper engagement member 604 has a pair of retaining legs 614a,614b that slide within the track 612, thereby slidably retaining the lower contact surface of the upper engagement member 604 to maintain contact with the upper inclined surface 608 of the lower engagement member 602. The lower engagement member 602 also includes a stop feature 616 formed so as to contact the retaining legs 614a of the upper engagement member 604 and thereby inhibit further travel of the upper engagement member 604 in the track 612.

Each of the engagement assemblies 306a,306b also includes an extension spring 620 and a torsion spring 622. The extension spring 620 has a first end 624 connected to the upper rail 104 and a second end 626 connected to the lower engagement member 602. The extension spring 620 applies a bias on the lower engagement member 602 as described below. In other examples, another type of biasing element is utilized instead of the extension spring 620, such as a torsion spring or compression spring. The extension spring 620 applies a biasing force on the lower engagement member 602 that is independent of the travel direction of either the lower or upper rails 102,104. In other non-illustrated examples, the extension springs 620 are oppositely provided such that the biasing force that they apply is flipped 180 degrees from that illustrated.

Figure 7A:
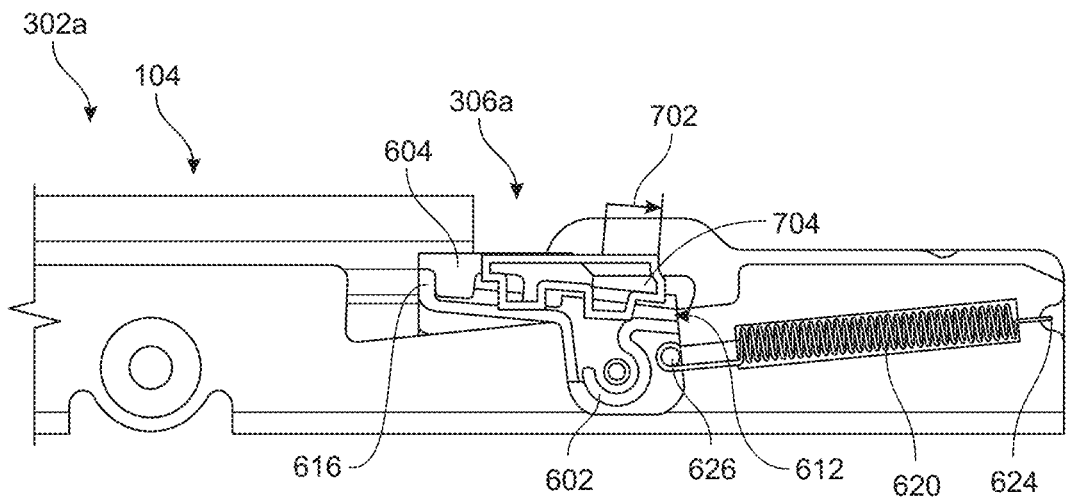
FIGS. 7A and 7B are partial side views of the engagement assembly depicting example operation.

The torsion spring 622 is sprung to bias the upper engagement member 604 towards the stop feature 616. In other examples, the stop feature 616 may be provided at an opposite end of the track 612 in addition to or instead of as illustrated. In particular, the torsion spring 622 is set within an embossment 621 formed on the lower engagement member 602, and applies force on a back side 623 of the upper engagement member 604. Thus, the torsion spring 622 biases the upper engagement member 604 into a default position, as illustrated in FIGS. 6A and 6B, where the upper engagement member 604 abuts against the stop feature 616 of the lower engagement member 602. When acted upon by the lower rail 102 as described below, the upper engagement member 604 may travel relative to the lower engagement member 602 along the channel or track 612 in a direction opposite the stop feature 616 against the biasing force applied by the torsion spring 622. As illustrated in FIG. 7A, the upper engagement member 604 may continue traveling in that opposite direction 702 until it reaches an extreme position 704 where further travel is inhibited by the torsion spring 622. Thus, the torsion spring 622 also functions to inhibit travel of the upper engagement member 604 on the lower engagement member 602 beyond the extreme position as described below. Similarly, the torsion spring 622 applies a biasing force on the upper engagement member 604 that is independent of the travel direction of either the lower or upper rails 102,104. In the illustrated example, the lower engagement member 602 and the upper engagement member 604 are biased in opposite directions, and, also in the illustrated example, the lower engagement member 602 and the upper engagement member 604 are biased towards a maximum thickness of the engagement assembly 306. In other non-illustrated examples, both the lower and upper engagement members 602,604 are biased by extension springs, or both biased by compression springs, or both biased by torsion springs, or both biased by different types of springs, etc.

The relative sliding between the lower engagement member 602 and the upper engagement member 604 changes the distance between the lower surface 606 of the lower engagement member 602 and the upper surface 610 of the upper engagement member 604 (i.e., the stack height) such that each of the engagement assemblies 306a,306b may maintain constant support and contact between inclined surfaces 304a,304b of the upper rail 104 and the lower surfaces 134 of the upper plate sections 112 of the lower rail 102 despite vehicle movement, or undulation or variation resulting from manufacture, as mentioned above. For example, in FIG. 7A, the stack height of the lower and upper engagement members 602, 604 (i.e., the distance between the lower surface 606 of the lower engagement member 602 and the upper surface 610 of the upper engagement member 604) is the smallest when the upper engagement member 604 is in the extreme position 704, and is the largest when in the default position shown in FIGS. 6A and 6B.

Thus, the engagement assembly 306 maintains contact between the lower rail 102 and the upper rail 104. In particular, the lower engagement member 602 maintains contact with the upper rail 104 and the upper engagement member 604 maintains contact with the lower rail 102. However, in some examples, one or more of the engagement assemblies 306 may be flipped upside-down such that the upper engagement member 604 maintains contact with the upper rail 104 and the lower engagement member 602 maintains contact with the lower rail 102. In the illustrated example, the engagement assembly 306 contacts an interior surface of the lower rail 102, but in other examples, the engagement assembly 306 may contact an exterior surface of the lower rail 102. Similarly, in the illustrated example, the engagement assembly 306 contacts an interior surface of the upper rail 104, but in other examples, the engagement assembly 306 may contact an exterior surface of the upper rail 104. As mentioned, the lower engagement member 602 maintains contact with a surface of the upper rail 104 and the upper engagement member 604 maintains contact with a surface of the lower rail 102. The surface of the lower rail 102 and/or the surface of the upper rail 104 contacted by the engagement assembly 306 may be an inclined surface. The portion of the engagement assembly 306 which slides on the inclined surface may be a side surface of the engagement assembly 306. For example, a side surface of the upper engagement member 604 may slide on the inclined surface of the upper rail 104, and a side surface of the lower engagement member 602 may slide on an interior surface of the lower rail 102. Thus, the engagement assembly 306 may be utilized to eliminate lateral rattling as well as (or instead of) vertical rattling of the lower and upper rails 102,104.

Figure 7B:
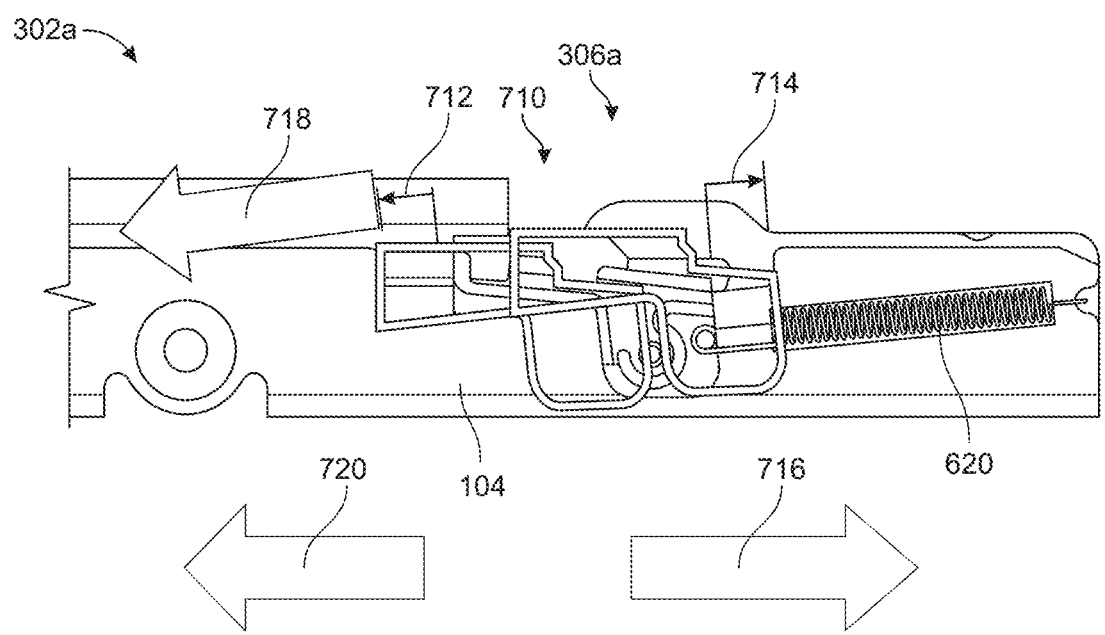

While FIG. 7A illustrates a travel or slide path of the upper engagement member 604 on the lower engagement member 602, FIG. 7B illustrates a travel or slide path of the lower engagement member 602 relative to the upper rail 104. In particular, FIG. 7B illustrates the lower engagement member 602 situated on the inclined surface 304 of the upper rail 104 in a default or nominal position 710, but movable forward or backward therefrom into a first extreme position 712 or a second extreme position 714. The lower engagement member 602 carries the upper engagement member 604, and those two members together are movable or slidable relative to the upper rail 104 between a first extreme position and a second extreme position. The extension spring 620 biases the lower engagement member 602 towards the second extreme position 714, and, when the upper rail 104 travels in a direction 716 relative to the lower rail 102, friction causes the lower engagement member 602 to move downward along the sloped incline surface 304 in a sliding direction 718 (with the upper engagement member 604 carried thereon and inhibited from moving relative to the lower engagement member 602 due to the stop feature 616) with minimal effect on sliding effort/resistance.

The inclination or slope of the inclined surfaces 304a, 304b of the upper rail 104 helps accommodate any variation in the gap between the lower and upper rails 102,104 which may result during manufacture or vehicle movement. As shown in FIG. 7B, when the upper engagement member 604 is fully biased against the stop feature 616 (in the sliding direction 718) on the lower engagement member 602, the upper engagement member's 604 upper surface 610 is relatively higher when the lower engagement member 602 is in the second position 714 than it is when the lower engagement member 602 is in the other extreme position 712 due to the inclination of the inclined surfaces 304a,304b of the upper rail 104.

Referring back to FIG. 7A, which illustrates the sliding or travel path of the upper engagement member 604 relative to the lower engagement member 602, the upper engagement member 604 is configured to slide within the track 612 formed in the lower engagement member 602 and is constrained between a first extreme position (where the upper engagement member 604 abuts the stop feature 616) and a second extreme position (where the upper engagement member 604 fully travels in direction 702 until the torsion spring 622 restricts any further travel). In another example, the stop feature 616 may be located on the opposite end of the track 612. By locating the stop feature 612 on one end of the track 612, the upper engagement member 604 may be slid onto the lower engagement member 602 during assembly. In even other examples, stop features 616 may be located on both ends of the track 612 and, during assembly, the upper engagement member 604 may be snapped onto the track 612 of the lower engagement member 602.

When not acted upon by sufficient frictional forces from movement of the lower rail 102 or the upper rail 104 (i.e., when installed in a vehicle, for example, with a seat and/or when a user thereon), the engagement assembly 306 is designed to locate in the default or nominal position 710 as shown in FIG. 7B. When in the default or nominal position 710, the lower engagement member 602 is substantially centered along the length of the inclined surface 304 of the upper rail 104 and the upper engagement member 604 is biased into the extreme position where it is pressed against the stop feature 616 in the direction of the spring force applied by the torsion spring 622 (see FIG. 7A). When the lower engagement member 602 is centered along the inclined surface 304, in the default or nominal position 710, the engagement assembly 306 has enough range of travel along the upper rail's inclined surface 304, in either the direction 716 or an opposite direction 720, to accommodate the expected vertical stack variation between the lower and upper rail 102,104 which may be encountered (due to manufacturing tolerances) as the upper rail 104 moves relative to the lower rail 102. Also, the upper engagement member 604 has enough travel range along the lower engagement member's 602 sloped track 612 to accommodate any vertical stack variation between the upper rail 104 and the lower rail 102 that may be encountered, when the upper rail 104 moves in the opposite direction 720 relative to the lower rail 102. This relative movement of the upper engagement member 604 and the lower engagement member 602 ensures constant contact between the lower rail 102 and the upper rail 104 while simultaneously preventing any instances of binding between the rails 102,104. For example, when the automobile seat and the upper rail 104 move in the direction 716, the lower engagement member 602 displaces in the downward direction 718 along the upper rail's 104 inclined surface 304 with minimal effect on sliding effort or resistance. In contrast, when the automobile seat and the upper rail 104 move in the opposite direction 720, the upper engagement member 604 may displace in a downward direction 702 along the lower engagement member's 602 track 612 with minimal effect on sliding effort or resistance. This relative movement of the upper engagement member 604 and the lower engagement member 602 prevents binding while maintaining constant contact between the upper rail 104 and the lower rail 102.

For example, the upper engagement member 604 may displace in a downward direction 702 if the gap between lower rail 102 and the upper rail 104 is reduced while the upper rail 104 moves in the opposite direction 720. Alternatively, if the gap remains constant or becomes larger while the upper rail 104 moves in the direction 720, binding should not occur and the upper engagement member 604 will not move. If the gap becomes larger while the upper rail 104 moves in the opposite direction 720, the spring 620 should bias the lower engagement member 602 toward the nominal position along the inclined surface 304 to maintain constant contact between the upper rail 104 and the lower rail 102.

Figure 8A:
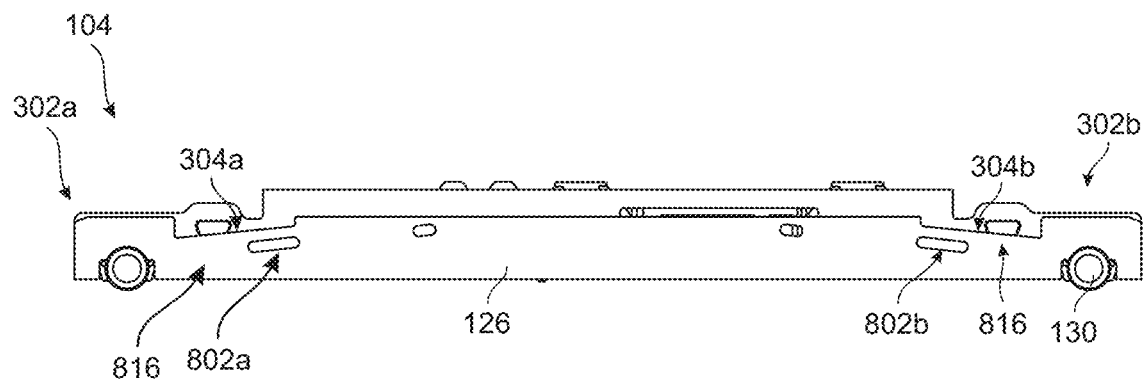
FIGS. 8A and 8B illustrate an example interaction of the engagement assemblies and the upper rail.
Figure 8B:
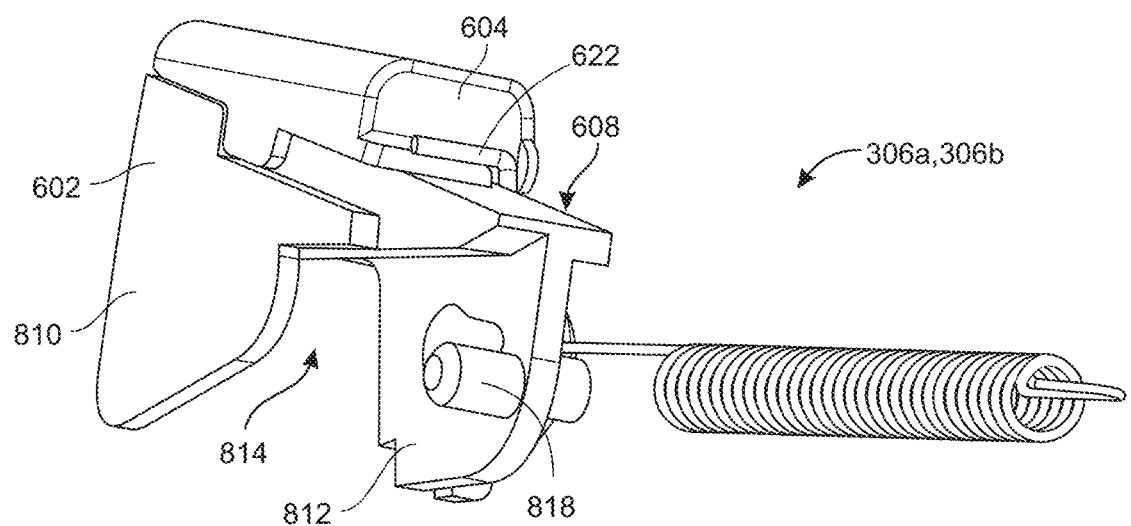

FIGS. 8A and 8B illustrate other aspects of how the engagement assemblies 306 may interact with the upper rail 104. As illustrated in FIG. 8A, the upper rail 104 may include slots 802a,802b for receiving a portion of the lower engagement member 602 described below. The slots 802a, 802b are positioned beneath the inclined surfaces 304a, 304b, respectively, and the slots 802a,802b may be sloped or inclined in an orientation matching that of their respective inclined surfaces 304a,304b. Thus, the first slot 802a may have the same slope or inclination as the inclined surface 304a, and the other slot 802b may have the same slope or inclination as the other inclined surface 304b. For example, the slots 802 and their corresponding inclined surfaces 304 may be parallel with each other (i.e., the slot 802a is parallel with the inclined surface 304a and the slot 802b is parallel with the inclined surface 304b). In this manner, the lower engagement member 692 (and the engagement assembly 306) moves linearly along linear paths defined by the slots 802 and their corresponding inclined surfaces 304. Thus, in examples where the orientation of either or both of the inclined surfaces 304a,304b is changed (i.e., flipped), the orientation of the slots 802a,802b may be correspondingly changed. Also, the lower engagement member 602 of the engagement assemblies 306a,306b may have a pair of legs 810,812 spaced apart from each other to define a channel 814. When assembled, the lower engagement member 306 rides on the inclined surface 304, with the spaced apart legs 810,812 straddling the sidewall 126 of the upper rail 104, such that a portion 816 of the sidewall 126 proximate to the inclined surfaces 304 is inserted within the channel 814 of the lower engagement member 602. Thus, the spaced apart legs 810,812 and the corresponding channel 814 formed thereby are dimensioned according to a thickness of the portion 816 of the upper rail's 104 sidewall 126. Also, a guide pin 818 is provided on the lower engagement member 602 and arranged to be received within the corresponding guide slot 802a or 802b. Here, the guide pin 818 is provided on the second leg 812 and protrudes therefrom into the channel 814; however, the pin 818 may instead be provided on the other leg 810, or a pin may be provided on both legs 810,812. When assembled, the lower engagement member 306 rides on the inclined surface 304, with the portion 816 of the sidewall 126 proximate to the inclined surfaces 304 inserted within the channel 814 of the lower engagement member 602 and with the pin 818 riding within the guide slot 802 to help retain the engagement assembly 306 on the upper rail 104.

Figure 9A:
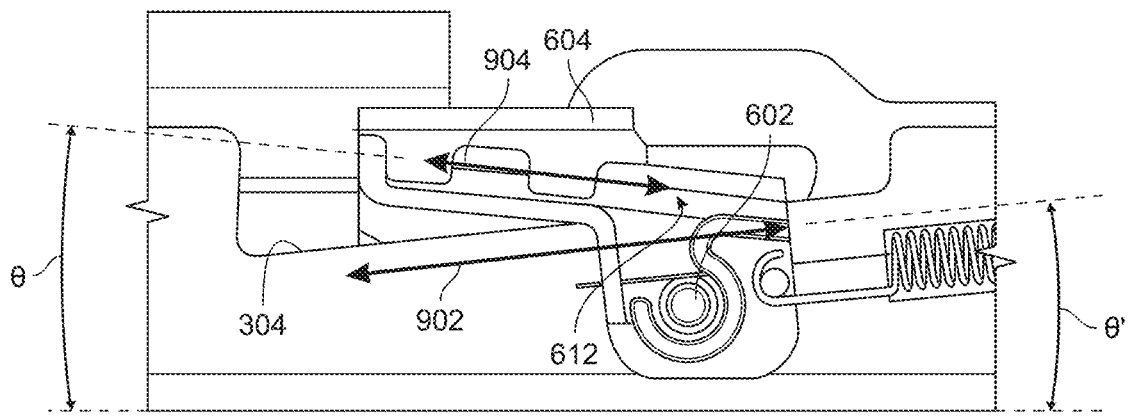
FIGS. 9A and 9B illustrate an example relative movement of the lower and upper engagement members.
Figure 9B:
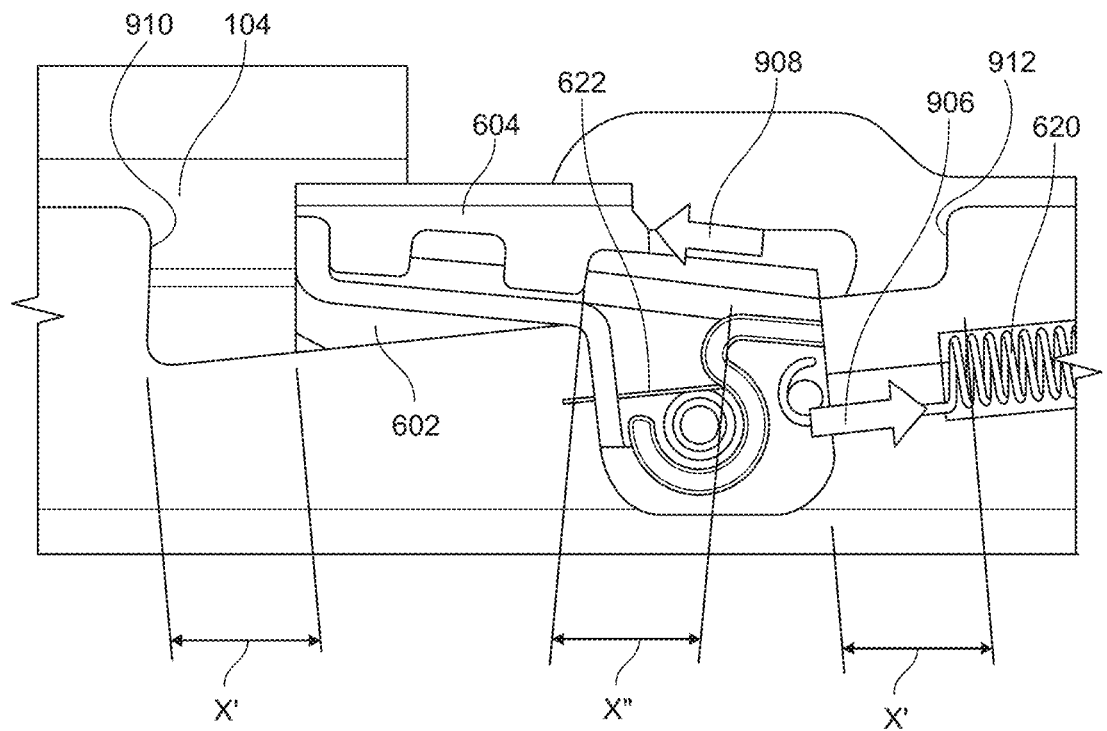

FIGS. 9A and 9B illustrate a relative movement of the lower and upper engagement members 602,604, according to one or more examples of the present disclosure. As illustrated in FIG. 9A, the lower engagement member 602 travels along the inclined surface 304 of the upper rail 104 along a primary path 902, and the upper engagement member 604 travels along upper surface 608 of the lower engagement member 602 (and within the channel or track 612 thereof) along a secondary path 904. The inclined surface 304 may be oriented at various angles θ relative to horizontal, such that the corresponding path 902 may similarly be oriented at various angles θ relative to horizontal. In the illustrated example, inclined surface 304 and the corresponding primary path 902 are oriented at an angle θ of 6 degrees. Also, the upper surface 608 (and the channel or track 612) of the lower engagement member 602 may be oriented at various angles θ' relative to horizontal, such that the corresponding secondary path 904 may similarly be oriented at various angles θ' relative to horizontal. In the illustrated example, inclined surface 304 and the corresponding path 902 are oriented at an angle θ' of 6 degrees. The angles θ, θ' may vary depending the amount of free play or looseness between the rails 102,104 and based on the travel amounts of the rails 102,104.

FIG. 9B illustrates the degree of movement of the lower and upper engagement members 602,604 of FIG. 9A, according to one or more examples of the present disclosure. The extension spring 620 applies force on the lower engagement member 602 thereby pulling the lower engagement member 602 (and the engagement assembly 306) as indicated by arrow 906. The system may be designed to provide the lower engagement member 602 various amounts of travel X' in direction 906. Here, for example, the lower engagement member 602 is configured to allow for up to 8 mm of travel X' in direction 906 from the default or nominal position. In the illustrated example, movement of the lower engagement member 602 is constrained or limited between wall portions 910,912 of the upper rail 104. For example, the slots 802 (see FIG. 8A) may be designed with suitable dimensions to allow for the desired amount of travel X' in direction 906 from the default or nominal position. Also, the torsion spring 622 applies force on the upper engagement member 604 to thereby urge the upper engagement member 604 in an opposite direction as indicated by arrow 908, and when in use, the upper engagement member may travel a distance X" in a direction that is opposite the arrow 908. Here, for example, the upper engagement member 604 is configured to allow for up to 8 mm of travel X" in the opposite direction from arrow 908.

Figure 10A:
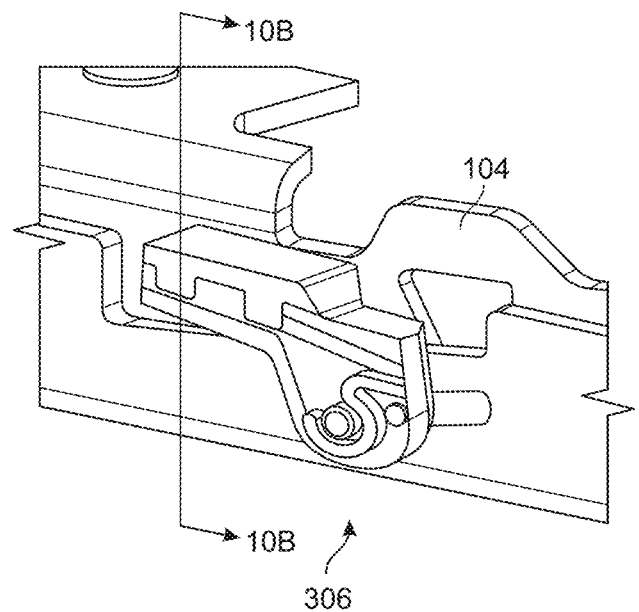
FIGS. 10A and 10B illustrate an alternate example interaction of the engagement assemblies on the upper rail.
Figure 10B:
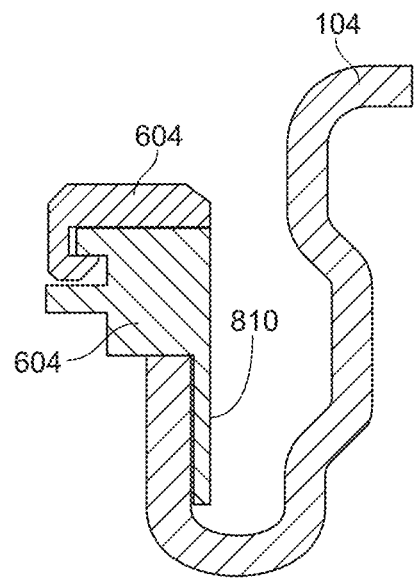

FIGS. 10A and 10B illustrate an alternate example interaction of the engagement assemblies 306 on the upper rail 104. In this example, the lower engagement member 602 includes a single wall 810 and no guide pin.

Figure 11A:
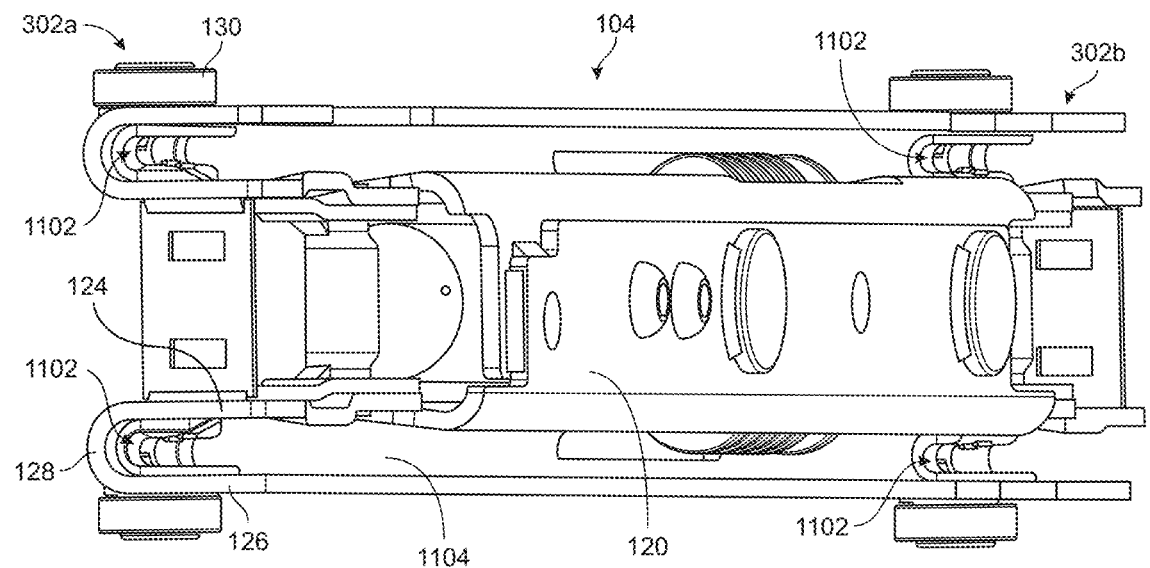
FIGS. 11A and 11B illustrate an example noise-reducing lateral control feature that may be integrated on the lower rail in some embodiments.
Figure 11B:
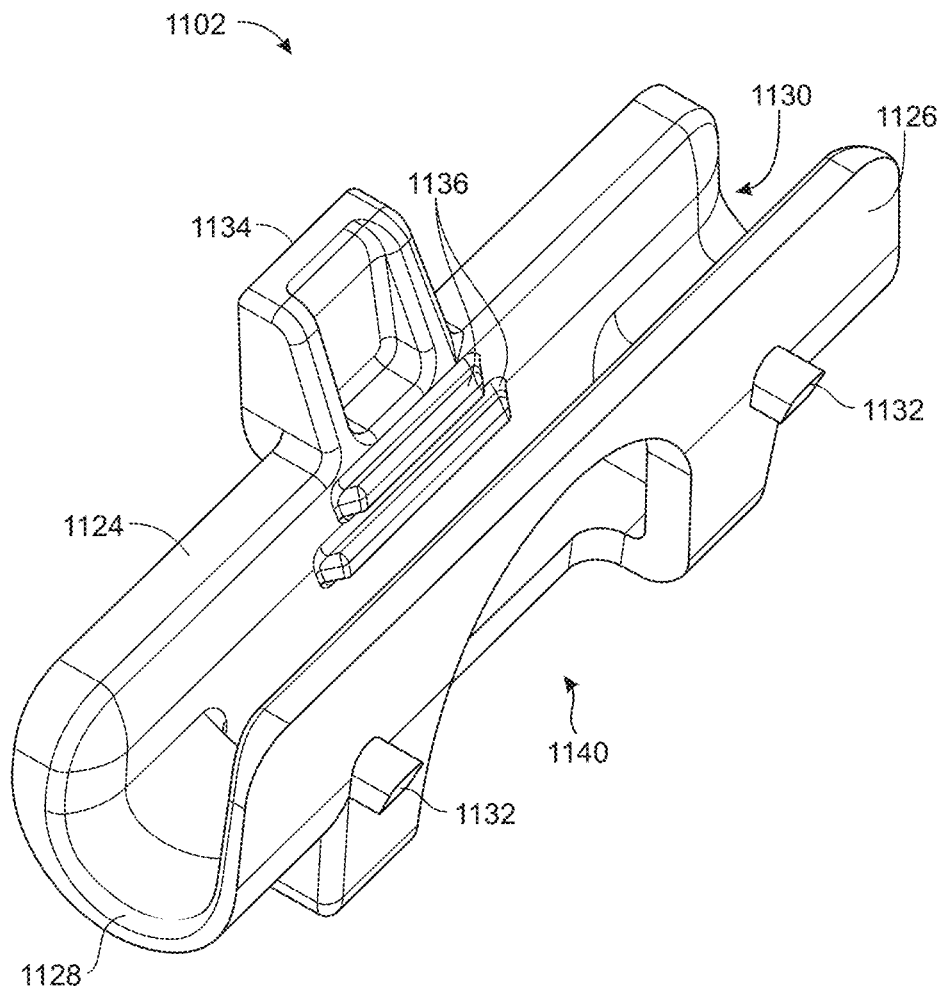

FIGS. 11A-11B illustrate example lateral control features 1102 to reduce rattling between the various components and thereby reduce noise. The lateral control features 1102 may be provided in an interior surface of the U-shaped side plates 120 of the upper rail 104. As shown, the lateral control features 1102 may be mounted on an interior surface 1104 of a recess 1106 defined between wall portions 1124,1126, 1128.

FIG. 11B illustrates a lateral control feature 1102 according to one or more examples. In the illustrated example, each of the lateral control features 1102 is a U-shaped member which includes an inner wall portion 1124, an outer wall portion 1126, and a bottom curved wall portion 1128 joining the inner and outer wall portions 1124,1126. The wall portions 1124,1126,1128 define a channel 1130 into which the left and right inner plates 114 of the lower rail 102 will extend when assembled. When assembled, the inner wall portion 1124 will abut the downwardly extending sidewall portion 124 of the upper rail 104, the outer wall portion 1126 will abut the upwardly extending sidewall portion 126 of the upper rail 104, and the curved bottom wall portion 1128 will abut the bottom portion 128 of the upper rail 104. The lateral control feature 1102 includes a pair of outer locking tabs 1132 and an inner locking tab 1134 that engage edges of a recess formed in the upper rail as described below. One or more crush ribs 1136 may be provided within the channel 1130 to ensure constant contact and inhibit rattling. The crush ribs 1136 are provided on an interior surface of the wall 1124 and, when fully assembled, will contact the left and right inner plates 114 of the lower rail 102 (see FIG. 2). The ribs 1136 may have various configurations and/or dimensions, for example, the ribs 1136 may be rounded and elongated as illustrated. In other examples, a leaf spring is utilized instead of the ribs. In other examples, both ribs and leaf springs are utilized (on the same side or on opposing sides). The lateral control feature 1102, including the crush ribs 1136 may be made from a non-metallic material, such as plastic, to avoid metal on metal contact. By contacting the left and right inner plates 114 of the lower rail 102, the lateral control feature 1102, which is mounted in the upper rail 104 will ensure constant contact between the lower and upper rails 102,104, while avoiding metal on metal contact. In addition, holes 1140 are formed in the lateral control feature 1102 to provide clearance and accommodate the rollers 130 and also to provide a drain for debris through the system.

Figure 12:
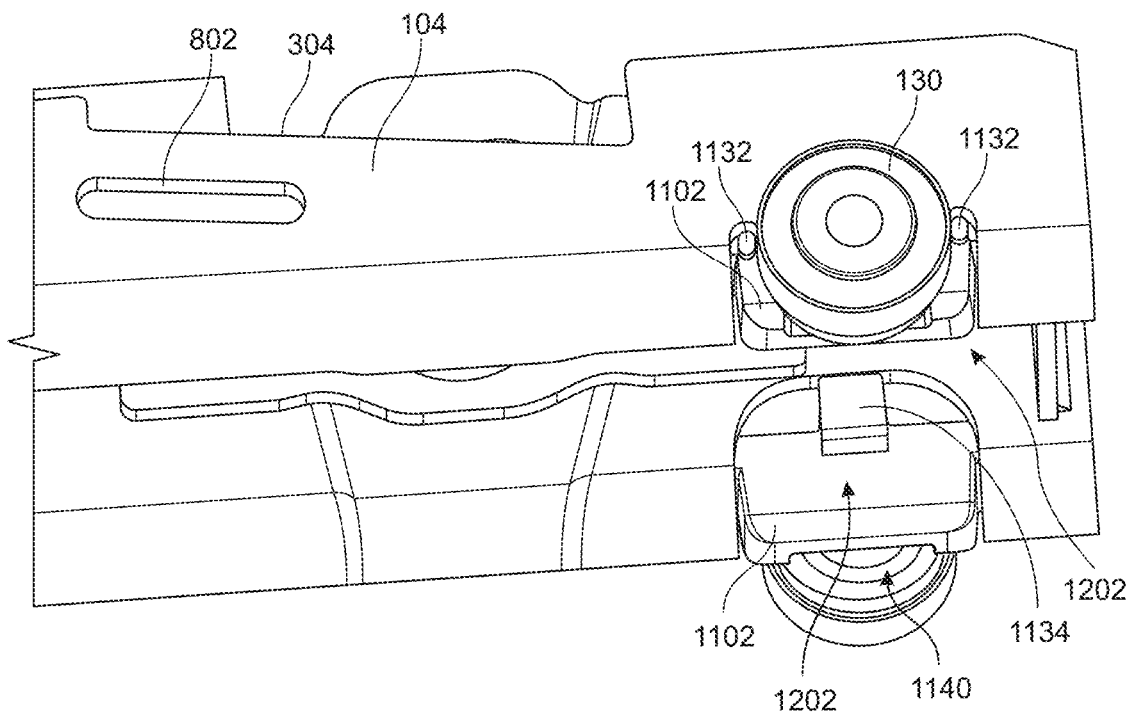
FIG. 12 illustrates an example installation of the lateral control features in an end of the upper rail.

FIG. 12 illustrates an example installation of the lateral control features 1102 in an end of the upper rail 104. In the illustrated example, cut-outs 1202 have been formed at an end of the upper rail 104 to accommodate the lateral control features 1102. As mentioned, the locking tabs 1132,1134 of the lateral control features 1102 allow it to snap into place, as the outer locking tabs 1132 and the inner locking tab 1134 engage edges of the cut-outs 1202 to thereby lock the lateral control features 1102 within the channel 1130. Also, the cut-outs 1202 provide clearance to accommodate the rollers 130 and provide a drain for debris through the holes 1140 in the lateral control feature 1102 and out of the system.

Figure 13:
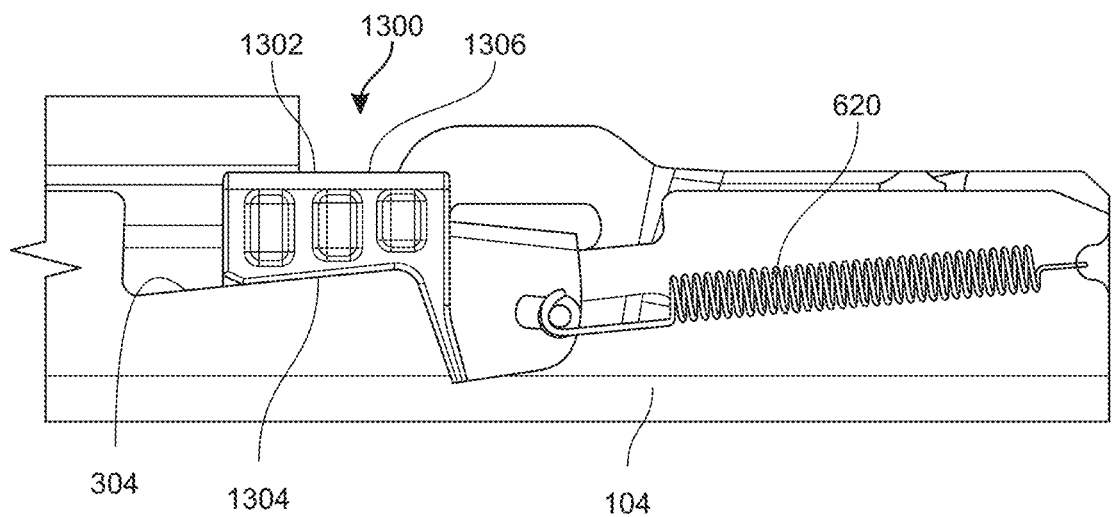
FIG. 13 is a side view of an alternate engagement assembly.

FIG. 13 illustrates an alternate engagement assembly 1300, according to one or more alternate embodiments. In the illustrated example, the alternate engagement assembly 1300 includes a single engagement member 1302 (or single "wedge"). Thus, the engagement assembly 1300 may be referred to as a single wedge design, as opposed to the above described engagement assembly 306 which utilizes a pair of engagement members 602,604 (i.e., a pair of "wedges") and which may be referred to as a dual wedge design. Here, the engagement member 1302 includes a lower surface 1304 that, when assembled, abuts and slides on the inclined surface 304 of the upper rail 104. Also, the engagement member 1302 includes an upper surface 1306 that, when assembled, abuts and slides on the lower surfaces 134 (not illustrated in FIG. 13) of the upper plate sections 112 of the lower rail 102.

Figure 14A:
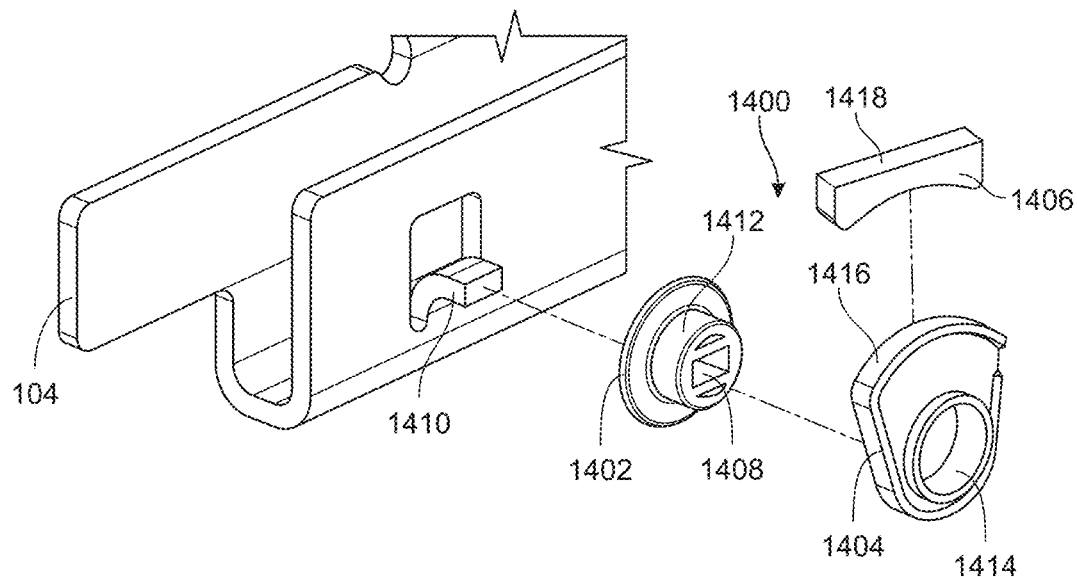
FIGS. 14A and 14B illustrate another alternate engagement assembly.
Figure 14B:
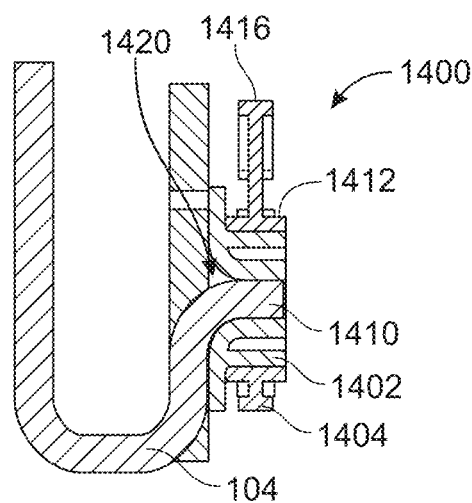

FIGS. 14A and 14B illustrates an alternate engagement assembly 1400, according to one or more alternate embodiments. In contrast to the above described engagement assembly 306, which utilizes a pair of spring loaded engagement members 602,604 (i.e., a pair of spring loaded "wedges"), the engagement assembly 1400 utilizes a spring loaded rotating feature (or cam) as described below. FIG. 14A is an exploded view of the alternate engagement assembly 1400. FIG. 14B is front cross-sectional view of the alternate engagement assembly 1400 when assembled on the upper rail 104 but without the slider feature described below.

As illustrated, the engagement assembly 1400 includes a hub member 1402, a cam member 1404, and a slider member 1406. The hub member 1402 is mounted on the upper rail 104. In the illustrated example, the hub 1402 is mounted on a tab 1410 of the upper rail 104, and the hub 1402 includes an interior bore 1408 that is keyed to fit on the tab 1410 to inhibit rotation of the hub 1402 about the tab 1410. The hub 1402 includes an exterior circular slide surface 1412 on which the cam 1404 is configured to rotate. The cam 1404 includes a bore 1414 and is mounted on the hub 1402 such that the bore 1414 of the cam 1404 slides on the slide surface 1412 of the hub 1402. The cam 1404 also includes a cam surface 1416 on which the slider member 1406 is provided. The slider member 1406 includes a lower surface (obscured from view) that engages the cam surface 1416 and the slider member 1406 also includes an upper surface 1418 that will engage the lower surfaces 134 (not illustrated in FIG. 13) of the upper plate sections 112 of the lower rail 102. While not illustrated, a biasing member (e.g., a torsion spring) may be supported on the hub 1402 and have a free end that is entrapped or retained by a feature (e.g., an embossment) on the cam 1404, such that the cam 1404 is biased into a default position, and urged back into that default position by the biasing member if the cam 1404 has been rotated clockwise or counter-clockwise out of the default position. Alternatively, a coil spring may be utilized to bias the cam 1404, in which a first end of the coil spring is connected to the upper rail 104 and a second end of the coil spring is connected to the cam 1404 as described in other examples, above. For example, a torsion spring or an extension spring may be utilized to bias the cam 1404 such that it is a spring-loaded cam. In the illustrated example, the slider member 1406 is not spring-loaded, but in other examples, it may be spring loaded with a torsion spring or an extension spring. In some examples, a feature 1420 is provide to help retain the hub 1402 on the tab 1410 of the upper rail 104, for example, a deformable feature for retaining the bore 1406 of the hub 1402 on the top radius of the tab 1410. The feature 1420 may be a snap-fit feature (or finger) integral with the hub 1402 that snaps into place upon insertion of the hub 1402 onto the tab 1410 and thereby secure the hub 1402 onto the upper rail's 104 tab 1410.

Figure 15A:
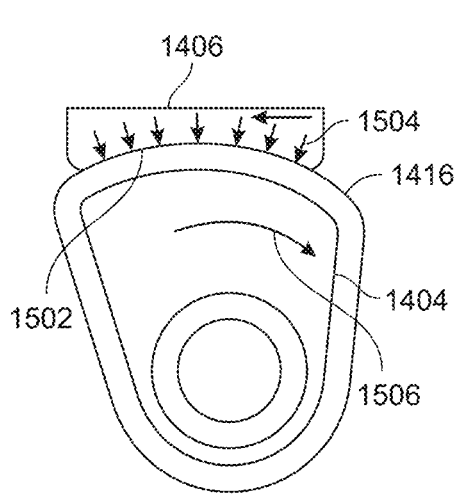
FIGS. 15A-15D illustrate variations of the engagement assembly of FIG. 14.

The slider member 1406 may have various lower surface configurations. FIGS. 15A-15D illustrate alternate lower surface configurations for the slider member 1406, according to various aspects of the present disclosure. In particular, FIG. 15A illustrates the slider 1406 of FIG. 14, wherein the slider 1406 includes a circular slider surface 1502 configured for full contact with the cam surface 1416 of the cam 1404, as indicated by arrows 1504. As seen in FIG. 15A, this design improves the interface/engagement between the cam 1404 and the slider 1406. As the upper rail 104 translates relative to the lower rail 102, the slider 1406 remains in full contact with the cam 1402, even during rotation of the cam 1402 as indicated by arrow 1506, due to the matching curvatures of the slider surface 1502 and the cam surface 1416. In some examples, the slider 1406 may include a retaining leg feature that hooks around a portion of the cam 1404, such that the slider 1406 is slidably retained on the cam 1404. Also, cam lock angles may vary, for example, from about 8 degrees through the range of tolerance.

Figure 15B:
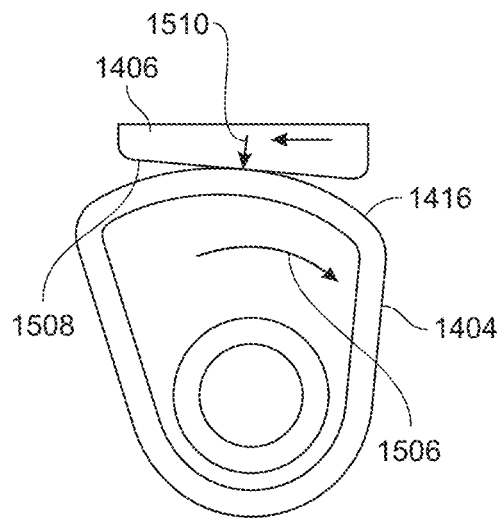

FIG. 15B illustrates the slider 1406 of FIG. 14, wherein the slider 1406 includes a flat angled slider surface 1508 configured to contact with the cam surface 1416 of the cam 1404 at a single point 1510. The single point 1510 is normal to the angled flat slider surface 1508. The flat angled slider surface 1508 may improve interface to the lower surfaces 134 (of the lower rail 102), because the single point of contact 1510 adds a degree of freedom in both travel directions, and the geometry of the cam 1404 and its surface 1416 can be modified to maintain a constant lock angle. Operation of the slider 1406 incorporating the flat angled slider surface 1508 is described below with reference to FIG. 18.

Figure 15C:
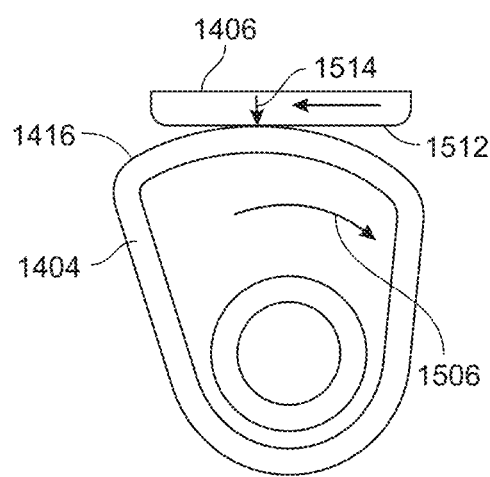

FIG. 15C illustrates the slider 1406 of FIG. 14, wherein the slider 1406 includes a flat slider surface 1512 (i.e., without an angle), which is also configured to contact with the cam surface 1416 of the cam 1404 at a single point 1514 that is normal to the flat slider surface 1512. The flat slider surface 1512 may improve interface to the lower surfaces 134 (of the lower rail 102), because the single point of contact 1512 adds a degree of freedom in both travel directions, and the geometry of the cam 1404 and its surface 1416 can be modified to maintain a constant lock angle.

Figure 15D:
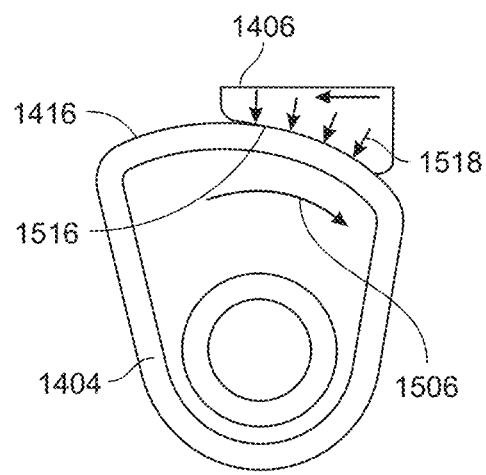

FIG. 15D illustrates the slider 1406 of FIG. 14, wherein the slider 1406 includes a semi or partial circular slider surface 1516. As compared to the circular slider surface 1502 of FIG. 15A, the semi or partial circular slider surface 1516 of FIG. 15D is shorter and therefore has less points of contact 1518. It should be appreciated, however, that the semi or partial circular slider surface 1516 of FIG. 15D may have a larger or even smaller length than as illustrated. The semi or partial circular slider surface 1516 of FIG. 15D also improves the interface to the lower surfaces 134 (of the lower rail 102).

Figure 16A:
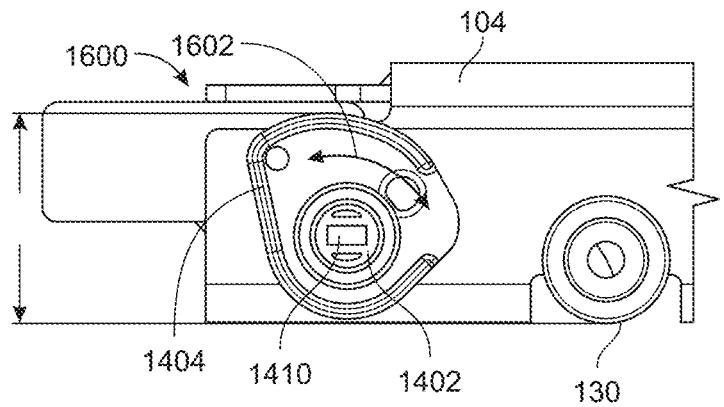
FIGS. 16A-16C is another alternate engagement assembly.
Figure 16B:
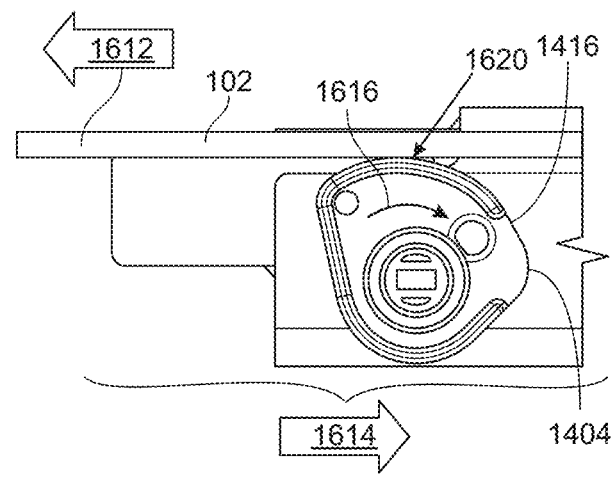
Figure 16C:
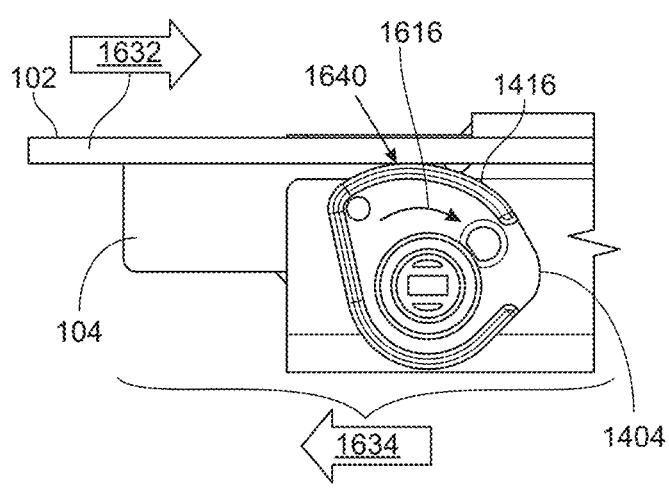

FIGS. 16A-16C illustrates an alternate engagement assembly 1600 utilizing the cam 1406, according to one or more alternate embodiments. In this example, a single cam 1406 is utilized. As illustrated, the cam 1406 may rotate, as indicated by arrow 1602, to take up (or account for) height variation 1604 that may be prevalent in the lower rail 102 and result from manufacturing long lower rails 102 as discussed above.

FIGS. 16B and 16C illustrate example operation of the engagement assembly 1600. In FIG. 16B, the lower rail 102 and the upper rail 104 are moving relative to each other, with the lower rail 102 moving in direction 1612 and the upper rail moving in direction 1614, and with the cam 1404 subject to a cam spring force 1616. Here, the motion 1612 of the lower rail 102 is oppositely directed from the spring force 1616, resulting in an applied force 1620 being applied to the cam surface 1416 as illustrated, wherein the applied force 1620 includes both the normal force plus any frictional forces. The frictional forces may be consistent based on spring output.

In FIG. 16C, the lower rail 102 and the upper rail 104 are moving relative to each other in opposite directions as shown in FIG. 16B, with the lower rail 102 moving in direction 1632 and the upper rail moving in direction 1634, and with the cam 1404 subject to the same cam spring force 1616. Here, the motion 1632 of the lower rail 102 is in the same direction as the application of the spring force 1616, resulting in an applied force 1640 being applied to the cam surface 1416 as illustrated.

Figure 17:
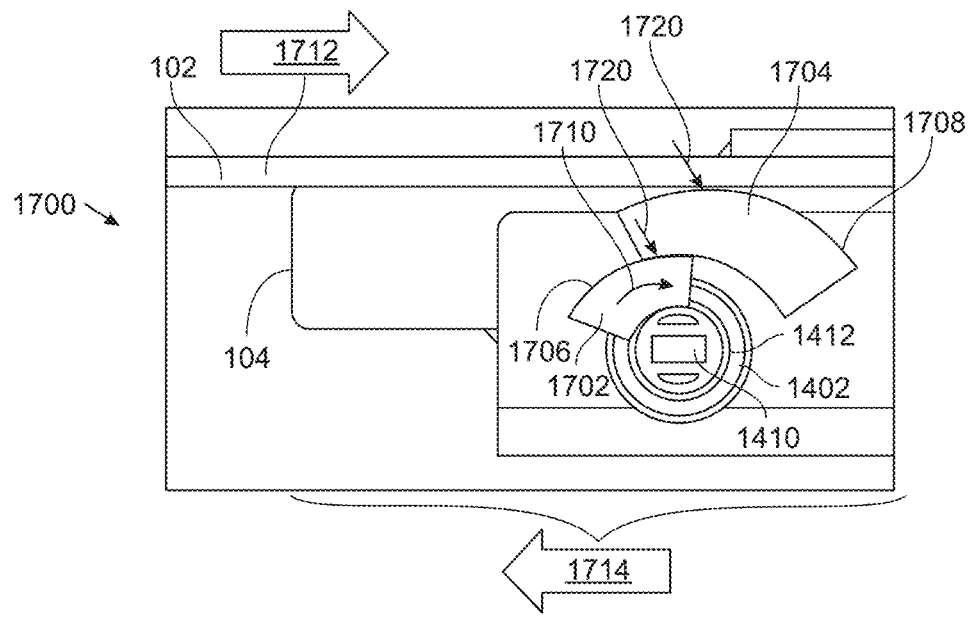
FIG. 17 illustrates an alternate cam engagement assembly, according to one or more alternate embodiments.

FIG. 17 illustrates an alternate cam engagement assembly 1700, according to one or more alternate embodiments. In the illustrated example, the engagement assembly 1700 is a dual cam engagement assembly having a first cam 1702 and a second cam 1704. The first and second cams 1702, 1704 overlap each other. The first cam 1702 is slidably positioned on the hub surface 1412 of the hub 1402. The second cam 1704 is slidably positioned on an outer cam surface 1706 of the first cam 1702. The second cam 1704 includes an outer cam surface 1708 which contacts or abuts the inner surface of the lower rail 102. Thus, the first cam 1702 may be referred to as the inner cam, and the second cam 1704 may be referred to as the outer cam. The first cam 1702 is subject to a cam spring force 1710. Here, the lower rail 102 and the upper rail 104 are moving relative to each other, with the lower rail 102 moving in direction 1712 and the upper rail 104 moving in direction 1714. This motion results in applied forces 1720 being applied to the cams' surface as illustrated, wherein the applied force 1720 includes both the normal force plus any frictional forces.

Figure 18:
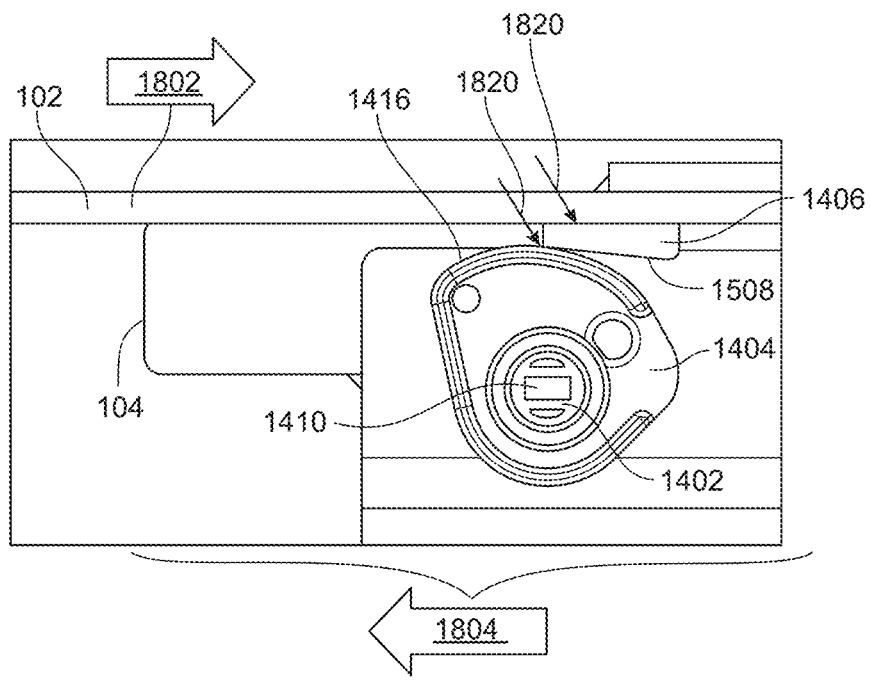
FIG. 18 illustrates an example operation of the engagement assembly of FIG. 15B.

FIG. 18 illustrates an example operation of the engagement assembly of FIG. 15B. In this example, the slider 1406 includes the flat angled slider surface 1508 configured to contact with the cam surface 1416 of the cam 1404 at a single point 1510. Here, the lower rail 102 and the upper rail 104 are moving relative to each other, with the lower rail 102 moving in a direction 1802 and the upper rail 104 moving in an opposite direction 1804, resulting in applied forces 1820 being applied at the interaction of the flat angled slider surface 1508 and the cam surface 1416 and between the inner surface of the lower rail 102 and the upper surface of the slider 1406.

Figure 19:
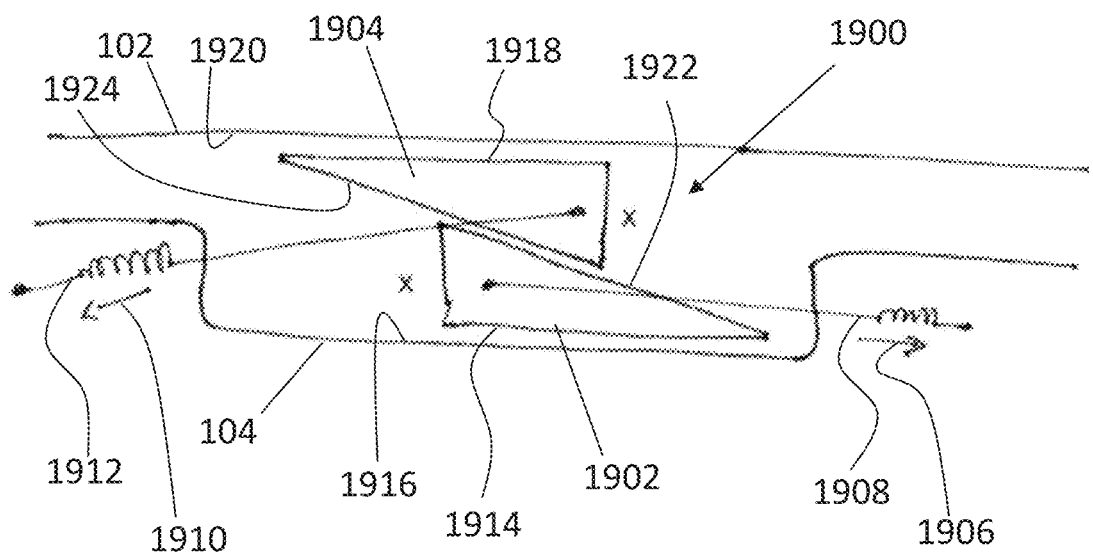
FIG. 19 illustrates another alternate engagement assembly.

FIG. 19 illustrates an alternate engagement assembly 1900, according to one or more alternate embodiments. In the illustrated example, the engagement assembly 1900 is a dual wedge engagement assembly having a first wedge 1902 and a second wedge 1904. The first wedge 1902 is biased in a first direction 1906 via a first biasing member 1908, and the second wedge 1904 is biased in a second direction 1910 via a second biasing member 1912. Here, the first and second biasing members 1910,1912 are extension springs; however, other types of biasing members may be utilized without departing from the present disclosure, as described herein. In the illustrated example, the first wedge 1902 includes a lower surface 1914 that is slidable on a surface 1916 of the upper rail 104, and the second wedge 1904 includes an upper surface 1918 that is slidable on a surface 1920 of the lower rail 102, as described herein. Also, the first wedge 1902 includes an upper inclined surface 1922 and the second wedge 1904 includes a lower inclined surface 1924 that abuts and slides on the upper inclined surface 1922 of the first wedge 1902 as described herein.

Embodiments herein pertain to seat rail assemblies 100 utilizing relatively long rails (or tracks) 102 which engage repeating slots 118 to drive and hold load. Even when manufactured with tight tolerances, there will likely still be backlash (e.g., lash, play, or slop) in the system exceeding customer requirements. Gearboxes with drive screws are utilized to drive the upper rail 104 within the lower rail 102, and this longitudinal slop may be inhibited by modifying the internal assembly of the gearbox and how the gearbox's screws engage the longitudinal slots 118 in the lower rail 102. Accordingly, gearboxes may be provided with one or more active lobe features for removing longitudinal play between the (gear box's) drive screw threads and the lower rail slots 118. As described herein, the active lobe may be positioned outside of the gearbox's bearing plates such that longitudinal play between the drive screw threads and the slots 118 is removed and longitudinal play is removed from within the gearbox that would otherwise exist between the bearing end plates.

Figure 20:
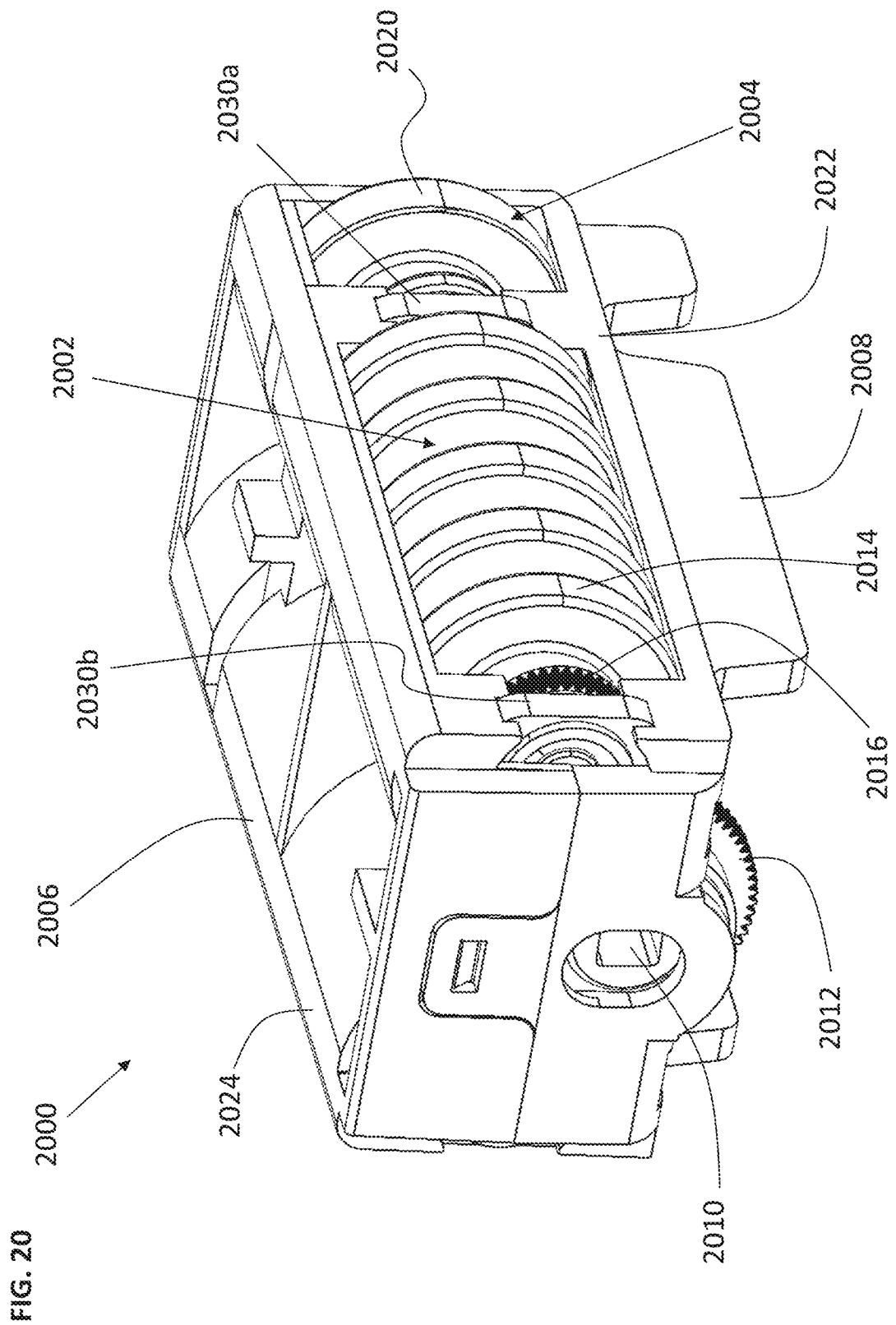
FIG. 20 illustrates a gearbox utilizable to drive the seat rail assembly described herein.

FIG. 20 illustrates a gearbox 2000 utilizable to drive the rail assemblies described herein, according to one or more embodiments of the present disclosure. In the illustrated example, the gearbox 2000 is attached to the upper rail 104 and operable to drive or translate the upper rail 104 relative to the lower rail 102. As hereinafter described, the gearbox 2000 includes a drive screw and is configured to manage or eliminate backlash caused by gaps or clearance between the drive screw and the lower rail slots 118.

Here, the gearbox 2000 includes at least one drive screw 2002, a lobe 2004 associated with each of the at least one drive screws 2002, and a housing 2006 within which the drive screw 2002 and associated lobe 2004 are provided. As hereinafter described, the lobe 2004 is spring-loaded (in other words, an "active lobe") such that it may operate to remove clearance that may otherwise exist between the drive screw 2002 and the slots 118 in the lower rail 102. The housing 2006 may include one or more legs 2008 configured to be inserted into corresponding slots (not shown) in the upper rail 104 (not shown). The gearbox 2000 includes an input 2010 into which an external drive shaft (not illustrated) or other external source of power may be inserted. The input 2010 is rotationally fixed to a drive gear 2012, such that the input 2010 and the drive gear 2012 rotate together (in unison). The drive screw 2002 includes a shaft (obscured from view) about which a thread 2014 extends. A driven gear 2016 is mounted on the shaft of the drive screw 2002 such that its teeth mesh with teeth on the drive gear 2012, and the driven gear 2016 is rotationally fixed to the drive screw shaft, such that the drive screw shaft and the driven gear 2016 rotate together (in unison). Accordingly, rotation of the input 2010 (e.g., via an exterior drive shaft) causes rotation of the drive gear 2012, which in turn drives the driven gear 2016 due to the intermeshing of the teeth of the driven gear 2016 with the teeth of the drive gear 2012, thereby causing rotation of the drive screw shaft and the thread 2014 of the drive screw 2002. Furthermore, the lobe 2004 includes a thread 2020 that abuts or contacts the thread 2014 of the drive screw 2002, such that rotation of the drive screw 2002 thereby causes rotation of the lobe 2004.

The housing 2006 may comprise a plurality of housing portions. In the illustrated example, the housing 2006 includes at least a first (e.g., lower or base) section 2022 and a second (e.g., upper or lid) section 2024. The housing 2006 retains a pair of bearing plates 2030a,2030b, and the bearing plates 2030a,2030b rotatably support the shafts of the drive screws 2002 as hereinafter described. In the illustrated example, the bearing plate 2030a is positioned between the lobe 2004 and the drive screw 2002; however, as described below, in some examples, the lobe 2004 may be positioned between the bearing plate 2030a and the drive screw 2002.

When the gearbox 2000 is assembled on the upper rail 104, the threads 2014 engage the lock holes 118 formed on the right and left inner plate sections 114 of the lower rail 102, such that actuation (rotation) of the drive screw 2002 translates the upper rail 104 relative to the lower rail 102.

Figure 21:
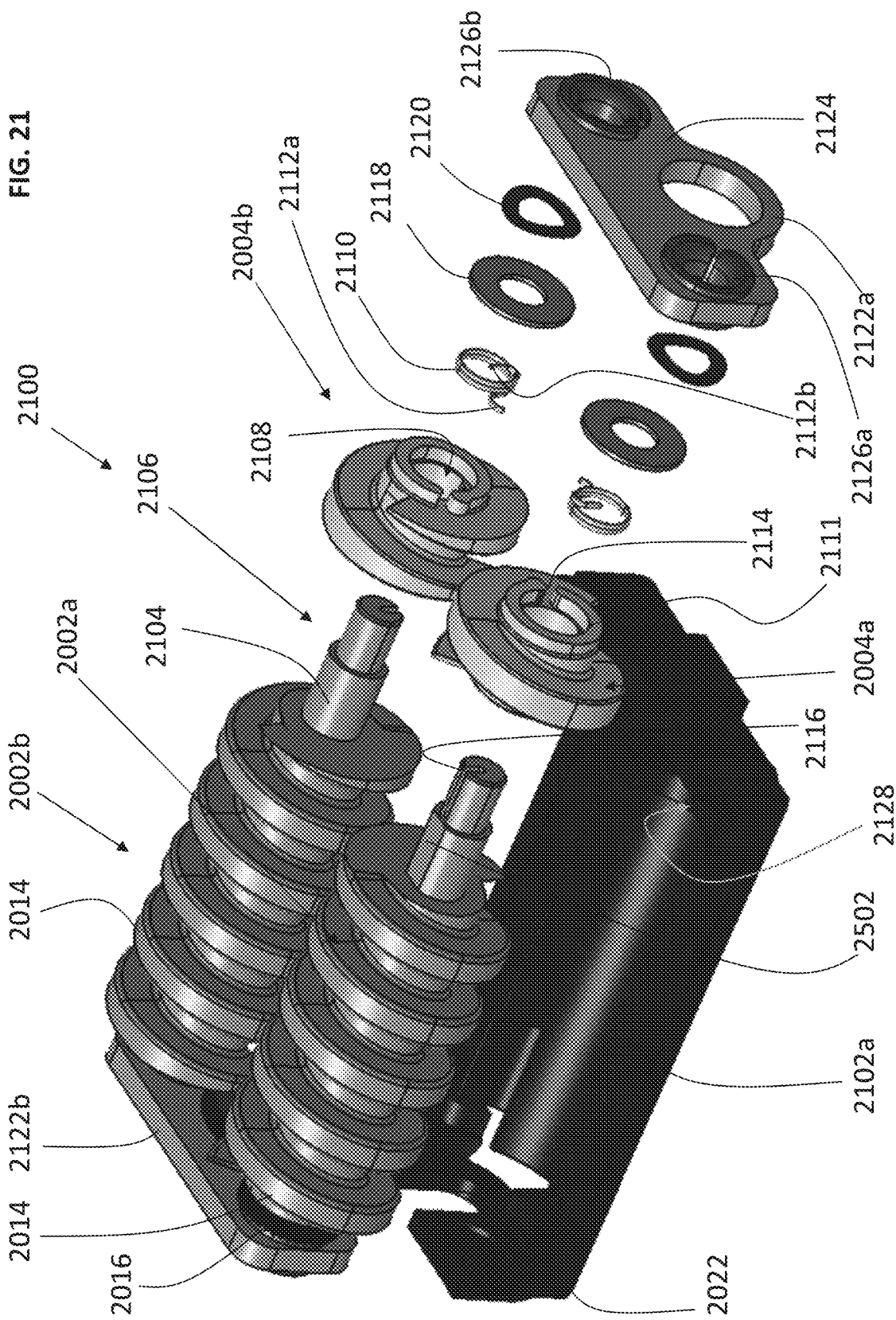
FIG. 21 illustrates a partial exploded view of the gearbox of FIG. 20.

FIG. 21 illustrates an exploded view of another example gearbox 2100 where the upper section 2024 of the housing has been removed. Also, FIG. 21 illustrates an example of the gearbox 2100 comprising a pair of the drive screws 2002a,2002b and a pair of corresponding lobes 2004a,2004b. The base section 2022 of the housing 2006 has a pair of wells 2102a,2012b shaped and sized to receive the drive screws 2002a,2002b and the corresponding lobes 2004a,2004b.

The drive screws 2002a,2002b each have a shaft 2104 on which their thread 2014 helically extends about. The driven gear 2016 is mounted at a first end (obscured from view) of the shaft 2104, whereas an opposing second end 2106 of the shaft 2104 extends beyond the thread 2014 and is provided without any helically extending thread. The lobes 2004a,2004b have a bore 2108 and are positioned on the second end 2106 of their corresponding shaft 2104. In this manner, the lobes 2004a,2004b can freely rotate on their corresponding shaft 2104 relative to their associated drive screw 2002a,2002b. In the illustrated examples, the lobes 2004a,2004b can freely rotate on their shaft 2104 for a limited range of rotation relative to their associated drive screw 2002a,2002b.

The lobes 2004a,2004b are each spring loaded. In the illustrated example, a lobe spring 2110 is provided in the bore 2108 of each lobe 2004a,2004b, such that the shaft 2104 extends through both the lobe 2004a,2004b and the corresponding spring 2110. In the illustrated example, an embossment feature 2111 is provided on an end of each lobe 2004a,2004b, where the portion of the bore 2108 that extends through embossment features 2111 is slightly larger in radius than the remaining bore portion of the lobe such that the lobe spring 2110 may be provided within the embossment feature 2111 and receive end 2106 of the shaft 2104 without interference. Thus, the bore 2108 may be slightly larger in dimension at the embossment feature 2111 so as to accommodate the lobe spring 2110, which has substantially the same bore dimension as the remaining portion of the bore through the lobes 2004a,2004b. When assembled, each of the lobe springs 2110 includes a pair of spring ends 2112a,2112b configured to engage one of the lobes 2004a,2004b and one of the shafts 2104. In particular, when assembled, the first spring end 2112a is retained in a slot or opening 2114 provided on each lobe 2004a,2004b proximate to the bore 2108, and the second spring end 2112b is retained/engaged within a slot 2116 provided in the second end 2106 of each shaft 2104. The lobe spring 2110 applies rotational spring force to the lobe 2004a,2004b such that, as the shaft 2104 rotates, the lobe spring 2110 may thereby apply a biasing force to the lobe 2004a,2004b about the shaft 2104. In this manner, each of the lobes 2004a, 2004b is rotationally biased about the shaft 2104. Thus, each of the lobes 2004a,2004b is coupled to its associated drive screw 2002a,2004b via its lobe spring 2110, and, while each of the lobes 2004a,2004b may rotate independent of its associated drive screw 2002a,2004b, such independent rotation is constrained or limited by the lobe spring 2110 which adds rotation force to the lobe 2004a,2004b depending on rotation of the drive screw 2002a,2002b.

In the illustrated example, the drive screws 2002a,2002b also each include a pressure plate 2118 and a washer 2120, and all of the components are held in place with a bearing plate assembly 2122. In the illustrated example, the washers 2120 are wavy washers and, when assembled, one face of the pressure plate 2118 contacts the embossment feature 2111 of the lobe 2004a,2004b and an opposite face of the pressure plate 2118 contacts the wavy washer 2120 and thereby absorbs force of the wavy washer 2120 without contacting lobe spring 2110. The bearing plate assembly 2122 includes a plate 2124 and a pair of rotatable couplings 2126a,2126b supported by the plate 2124. Each of the rotatable couplings 2126a,2126b may rotate within the plate 2124 and are configured to each receive one of the ends 2106 of the shaft 2104, such that the ends 2106 of the shaft 2104 are rotationally supported by the bearing plate assembly 2122 when assembled. In the example embodiment of FIG. 21, the bearing plate 2122a is provided at the end 2106 of the shaft 2104, such that the lobes 2004a,2004b interpose the bearing plate 2124 and the threads 2014 of the drive screws 2002a,2002b. However, the bearing plate 2122a may be differently positioned, for example, the bearing plate 2122a may be positioned to interpose the threads 2014 and corresponding lobes 2004a,2004b. Also, the bearing plates 2122a,2122b are retained within slots 2128 formed in the housing 2006. Here, the slots 2128 may be provide in both the lower and upper housing sections 2022,2024 and the slots 2128 are formed so as to position bearing plate 2122a at the terminal ends of the shafts 2104 proximate the lobes 2004a,2004b (and opposite the threads 2014 of the drive screws 2002a,2002b).

Figure 22:
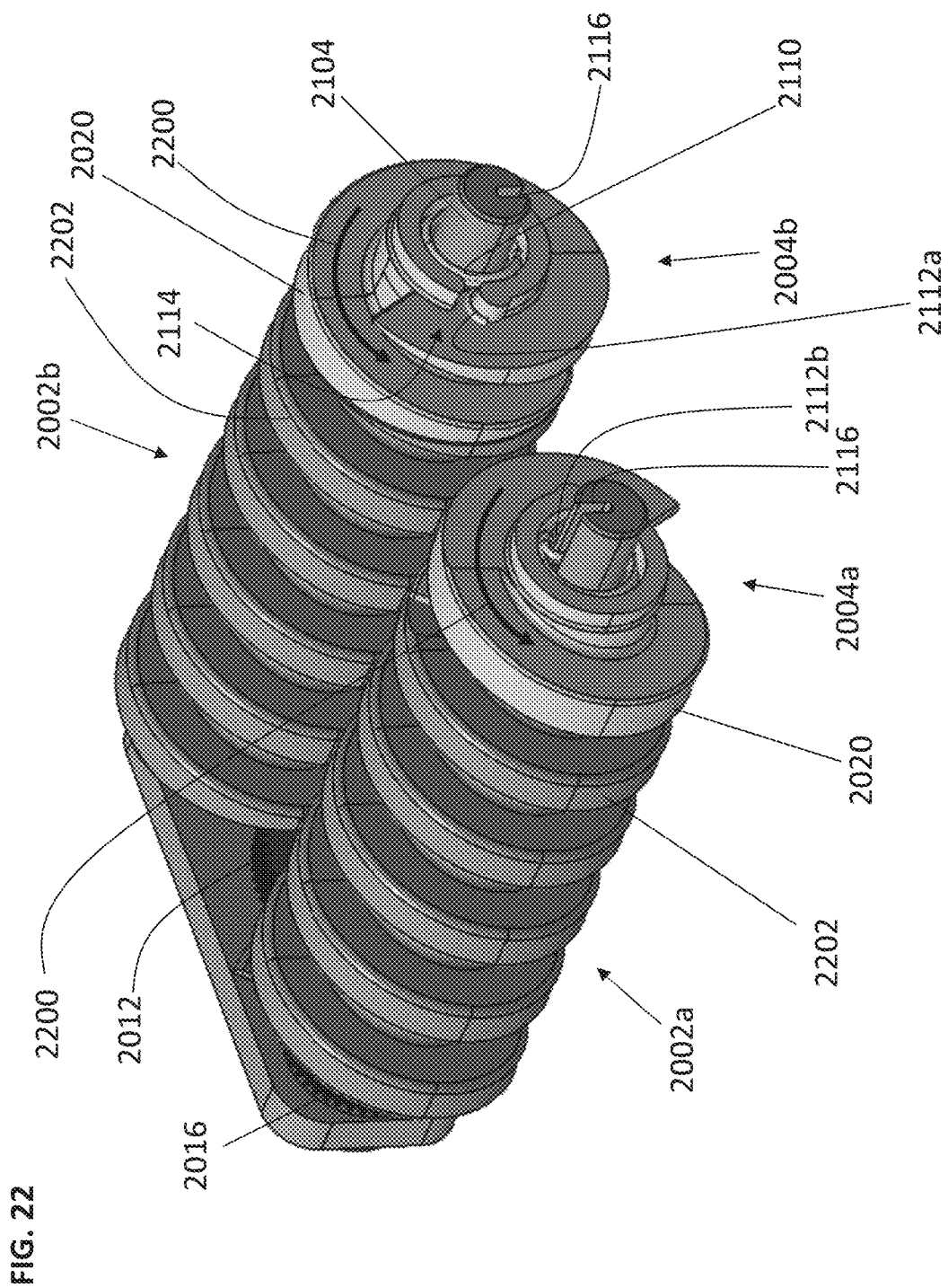
FIG. 22 illustrates an example operation of the gearbox's drive train.

FIG. 22 illustrates example operation of a drive train of the gearbox 2100 of FIG. 21. In particular, FIG. 22 illustrates how each of the lobes 2004a,2004b are spring loaded via the lobe springs 2110, such that the lobes 2004a,2004b are "active" rather than just being free-floating. In the illustrated example, the lobe springs 2110 apply a counter clockwise torsional spring force on the lobes 2004a,2004b about their shafts 2104 as indicated by arrows 2200. The spring loaded lobes 2004a,2004b fill any clearance in the slots 118 of the lower rails 102, thereby eliminating any fore/aft slop.

This torsional force 2200 rotates the associated lobe 2204a,2004b independent of the associated drive screw 2002a,2002b, which thereby effectively increases the pitch of a single thread. In other words, the pitch is increased between the active lobe and the last thread on the drive screw. In particular, each lobe spring 2110 increases the width between the thread 2020 of the lobe 2204a,2004b and a final thread 2202 of the drive screws 2002a,2002b. The increasing width between the final screw thread 2202 and the lobe thread 2020 fills any additional clearance within the slots 118 of the lower rail 102. In one example, the active lobe maintains a pressure angle that removes an opportunity for back-drive under longitudinal loading. The pressure angle is defined by the contact surface between the active lobe thread and the lower rail slot 118. In a particular example, a pressure angle of 7.4 degrees is selected to prevent back-drive under longitudinal loading. Here, the combination of no back-drive and no clearance between threads and the slots 118 in the lower rail 102 results in no longitudinal free play.

Figure 23:
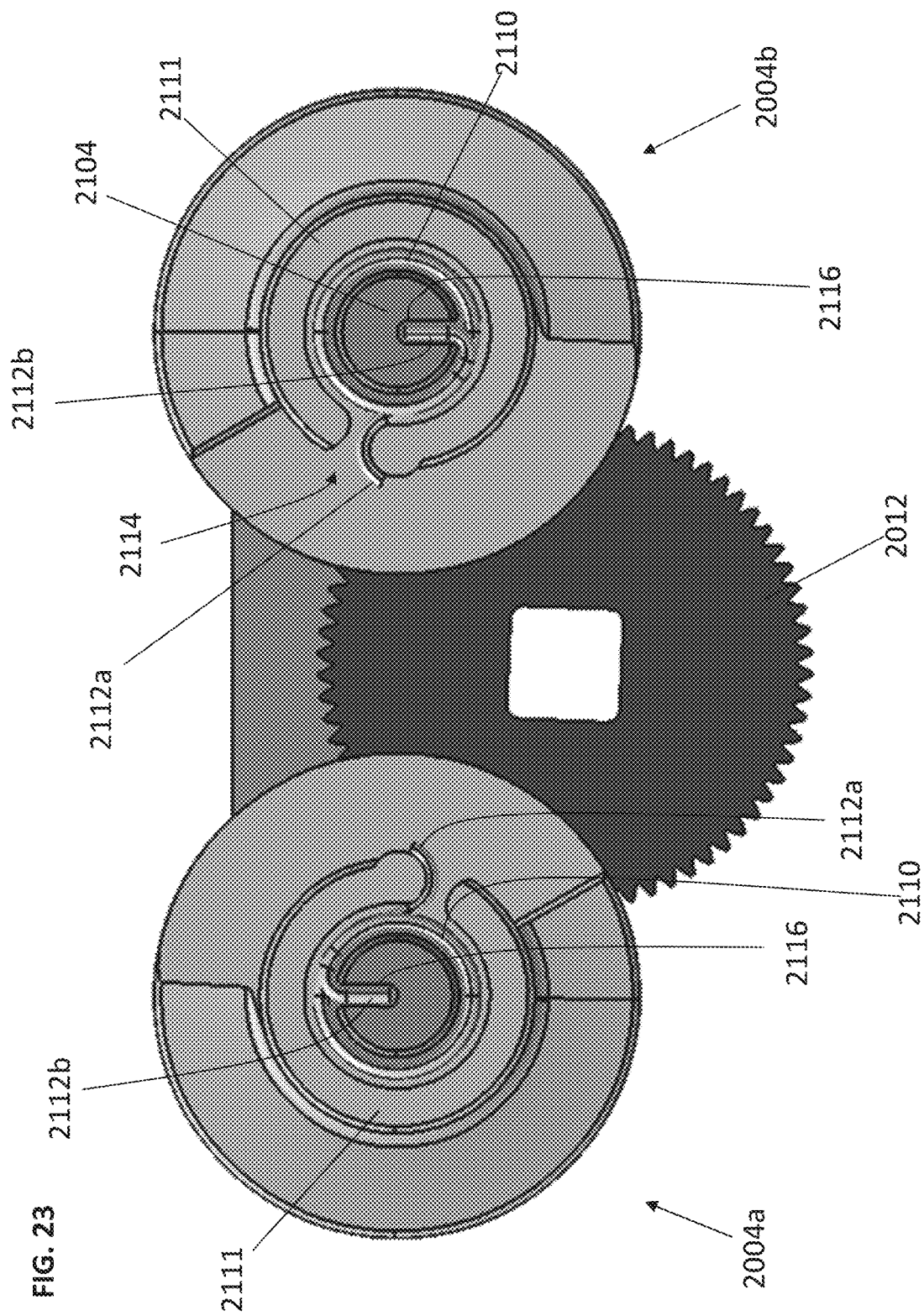
FIG. 23 is an end view of the drive chain of FIG. 22.
Figure 24:
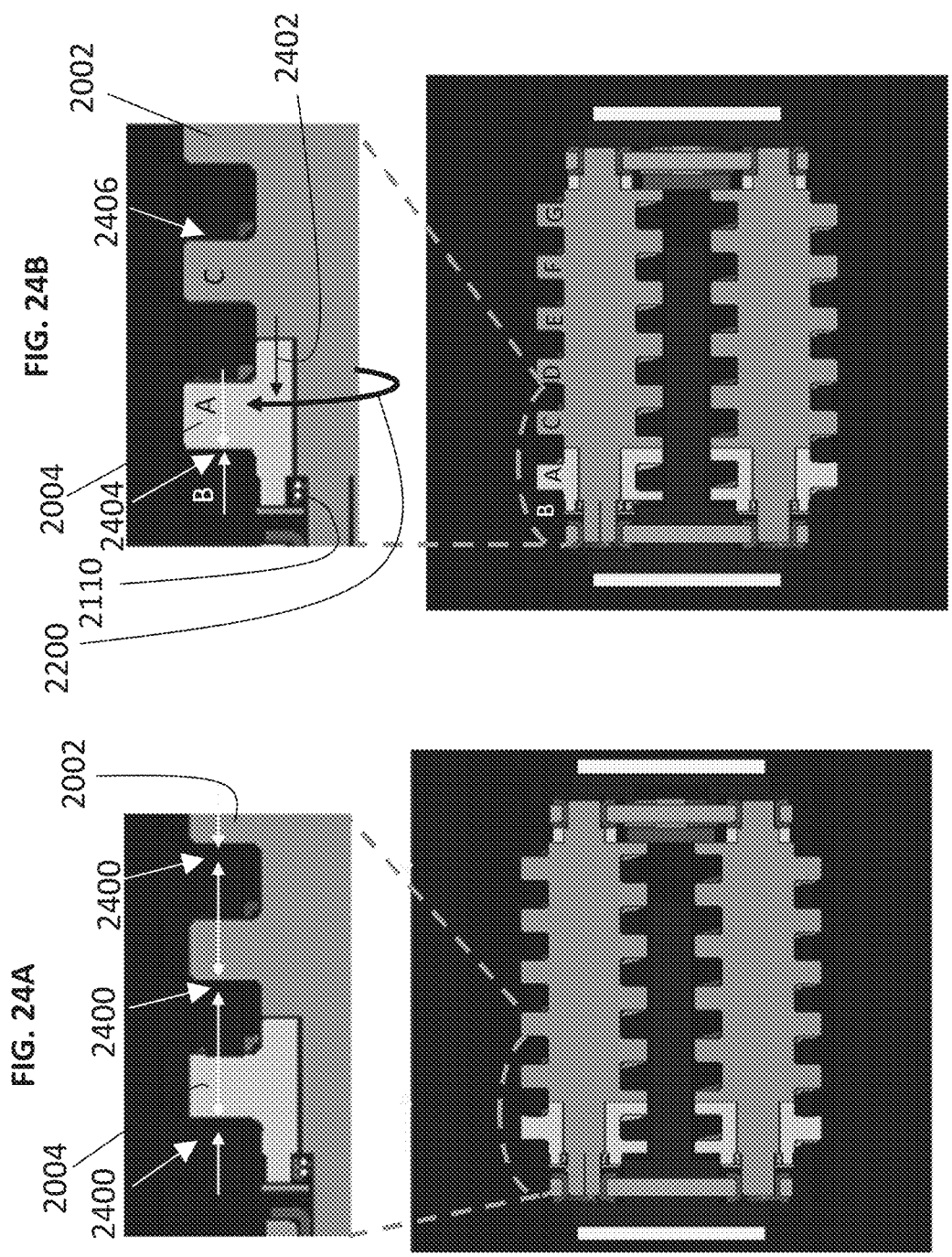
FIGS. 24A and 24B illustrate example operation of non-spring loaded (inactive) lobe and a spring loaded (active) lobe, respectively, in a seat rail assembly.

FIG. 23 is an end view of the drive train of FIG. 22. In particular, FIG. 23 illustrates an example configuration of the lobe spring 2110 interacting with the shafts 2104 and the associated lobe 2204a,2004b. FIGS. 24A and 24B illustrate example operation of the active (i.e., spring loaded lobes 2004a,2004b) and how they operate to remove slop in the system. In particular, FIG. 24A illustrates a system where the lobes 2004 are not spring-loaded (or active) as described herein, which results in a gap (or clearance) 2400 existing on the same side of the threads of the drive screw 2002 and lobe 2004, between such threads and the slots 118 of the lower rail 102. This results in back lash (or slop or free play). FIG. 24B illustrates how such free play is eliminated by activating the lobes 2004, for example, with the lobe springs 2110 imparting a torsional spring force 2200 on the lobes 2004a, 2004b about their shafts 2104, which thereby drives the lobes 2004 in a direction indicated by arrow 2402 (relative to the shaft 2104 of the drive screw 2002) and thereby closes the gap between the lobe 2004 and the slot 118, as indicated by arrow 2404. Thus, the lobe 2004 contacts a first side of one of the slots 118, indicated by the arrow 2404, whereas the dive screw 2002 threads contact an opposite side of the slots, as indicated by arrow 2406, such that there is no slop or free play. In this manner, the lobes 2004a,2004b spring loaded by the springs 2110 (i.e., the active lobes) eliminate the longitudinal free-play associated with lower rail's 102 slots 118 and the thread of the drive screw 2002.

The spring-loaded active lobe 2004 rotates as shown by arrow 2200 until a tooth A of the lobe 2004 contacts an opposite tooth wall B of the lower rail 102, thereby eliminating the gap as indicated by 2404. Teeth C-G of the drive screw 2002 are the threads 2014 of the drive screw 2002 and, because the pitches of the threads 2014 of the drive screw 2002 are fixed and uniform, the drive screw 2002 without an active lobe will have longitudinal free-play that is equal to the amount of clearance between the thread of the drive screw 2002 and the slots 118 of the lower rail 102. However, incorporating the lobe tooth A of the lobe 2004 which is spring loaded by the spring 2110, creates a wedge in cooperation with tooth C of the drive screw 2002, which thereby eliminates free-play or slop.

Figure 25:
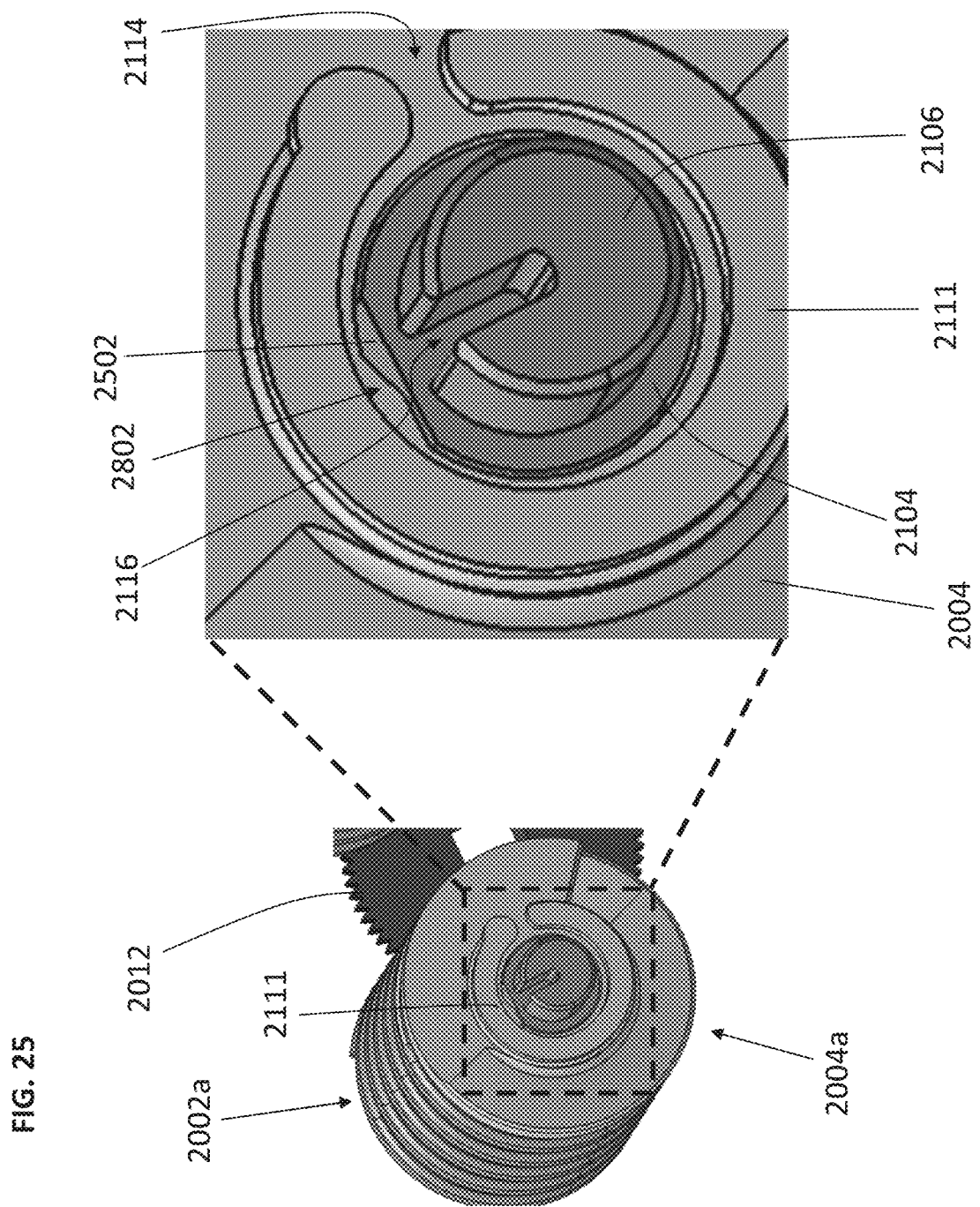
FIG. 25 illustrates an example drive screw configured to limit rotation of the lobe.

As previously mentioned, rotation of the active lobe 2004 relative to the drive screw 2002 is limited. FIG. 25 illustrates an example of the drive screw 2002 configured to limit rotation of the lobe 2004, according to one or more embodiments. In particular, FIG. 25 illustrates one of the lobes 2004a, but it should be appreciated that the principle described in this figure is applicable to the other lobe 2004b. Thus, this figure is described with reference to an individual one of the lobes 2004. In the illustrated example, a feature 2502 is provided on the shaft 2104 proximate to the shaft end 2106. Here, the feature 2502 is a flat surface formed into the circumference of the shaft 2104. The feature 2502 is configured to allow a limited amount of rotation of the lobe 2004 relative to the shaft 2104. Here, the feature 2502 allows for about 10 degrees of relative rotation of the lobe 2004, which is sufficient to eliminate system clearance. However, in other examples, the feature 2502 may have different dimensions to allow for a different degree of relative rotation of the lobe 2004 sufficient to eliminate clearance from the system. As described below, a feature is provided within the bore 2108 of the lobe 2004 that will engage the flat feature 2502 when rotated a certain amount of degrees either clockwise or counterclockwise.

Figure 26B:
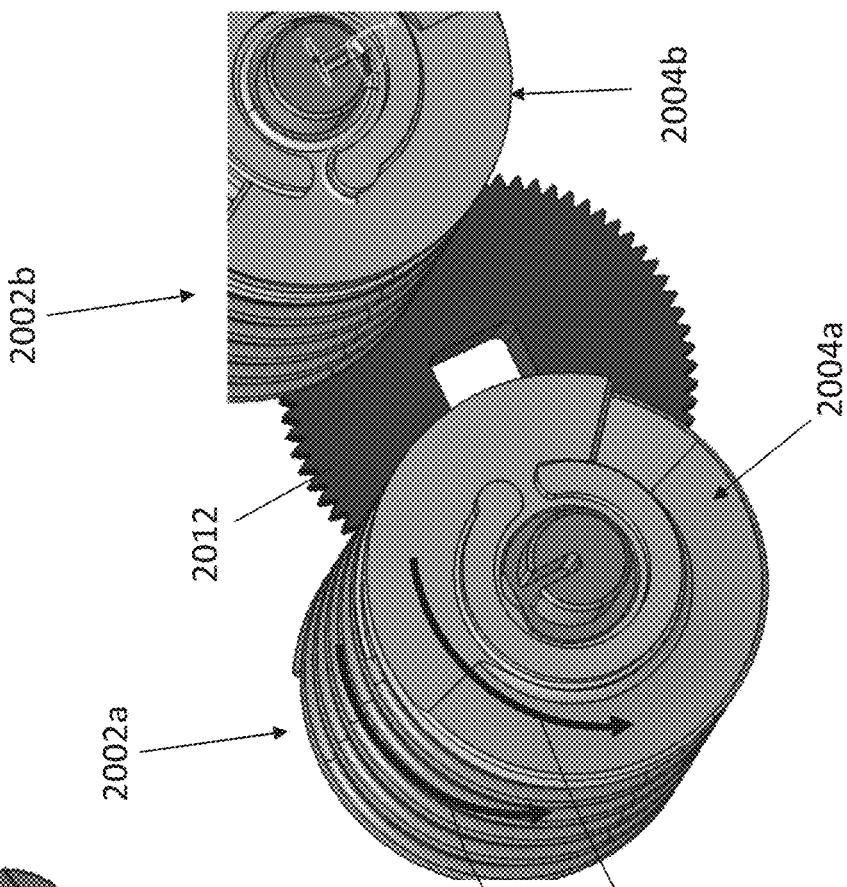
FIGS. 26A and 26B illustrate example operation of the gearbox's drive train to eliminate slop in the system.
Figure 26A:
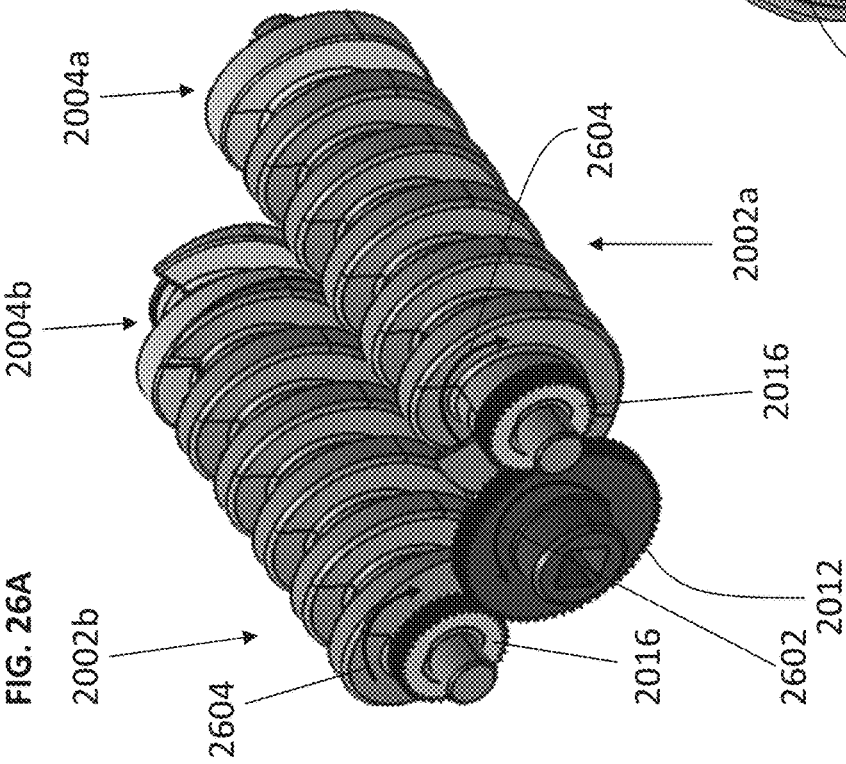

FIGS. 26-27 illustrate example operation of drive train within the gearbox 2100 to eliminate slop in the system. FIG. 26A illustrates counter-clockwise rotation of the drive gear 2012, as indicated by the arrow 2602. The counter-clockwise rotation 2602 of the drive gear 2012 results in clockwise rotation of the driven gears 2016, as indicated by the arrows 2604, via interaction of the drive gear 2014 with the driven gears 2016 described above. The clockwise rotation 2604 of the driven gears 2016 in turn results in clockwise rotation 2604 of the drive screws 2002a,2002b as such rotation is transmitted through the drive shaft 2104 on which the drive gears 2016 are fixed. Thus, counter-clockwise (2602) motor input results in the drive screws 2002a, 2002b rotating clockwise (2604), which, in the present example, in turn results in the upper rail 104 traveling in a rearward direction along the lower rail 102. FIG. 26B illustrates a close up of the active lobes 2004a,2004b of FIG. 26A, which are fully engaged or sprung via their lobe springs 2110. Here, rotation of the drive screw 2002a,2002b is transmitted to the lobes 2004a,2004b through the springs 2110, and the springs 2110 may impart a rotation 2604 on the lobes 2004a,2004b to close any gap between the lobe tooth A and the tooth B of the slot 118 of the lower rail 102. In particular, the rotating drive screw 2002 acts on the spring 2110 at its least amount of applied moment (i.e., the moment decreases the further the active lobe 2004 cinches/binds on the lower rail 102 or as the torsional spring approaches its free or unloaded position). The rotating drive screw 2002 acts on the lobe spring 2110 when the spring 2110 is applying a minimum moment to the active lobe 2004. The spring's 2110 minimum moment occurs when the lobe spring is approaching its free position (unloaded position) until the active lobe has removed all longitudinal clearance by contacting a tooth wall of a slot of the lower rail that is opposite of the tooth wall that is contacted by the drive screw or the rotation limiting feature stops further rotation of the active lobe 2004. Thus, clockwise rotational movement 2604 of the drive screw 2002 will open up the gap between active lobe 2004 and slots 118 in the lower rail 102 thereby allowing system to move with little drag while the spring 2110 operates to close the gap by urging the lobe 2004 into contact with the lower rail 102. In particular, when the drive screw is rotating clockwise when viewed from the end of the drive train that includes the drive gear 2012 as shown in FIG. 26A, this results in the upper rail traveling rearward relative to the lower rail. In the example illustrated in FIG. 22, the lobe spring 2110 is biased in the counter-clockwise direction when viewed from the end of the drive train that includes the active lobe 2004. When viewed from the end of the drive train that includes the drive gear 2012 as shown in FIG. 26A, the same example lobe spring 2110 appears to be biased in the clockwise direction. In this example, the drive screw 2002 is rotating in the same direction that the lobe spring 2110 is rotationally biasing the active lobe 2004. The second spring end 2112b is retained/engaged within a slot 2116 provided in the second end 2106 of each shaft 2104, so as the shaft 2014 traverses rearward, it will attempt to pull the lobe rearward out of contact with the opposite tooth wall (shown by 2404 in FIG. 24B) while the lobe spring 2110 simultaneously rotates the active lobe 2004 further away from the drive screw in the forward direction to maintain contact with the opposite tooth wall. Since the drive screw is not driving the active lobe 2004 further into the opposite tooth wall, additional friction or drag on the system is not created.

FIG. 27A illustrates clockwise rotation of the drive gear 2012, as indicated by the arrow 2702. The clockwise rotation 2702 of the drive gear 2012 results in counter-clockwise rotation of the driven gears 2016, as indicated by the arrows 2704, via interaction of the drive gear 2014 with the driven gears 2016 as described above. The counter-clockwise rotation 2704 of the driven gears 2016 in turn results in counter-clockwise rotation 2704 of the drive screws 2002a, 2002b as such rotation is transmitted through the drive shaft 2104 on which the drive gears 2016 are fixed. Thus, clockwise (2702) motor input results in the drive screws 2002a, 2002b rotating counter-clockwise (2704), which, in the present example, in turn results in the upper rail 104 traveling in a forward direction along the lower rail 102. FIG. 27B illustrates a close up of the active lobes 2004a, 2004b of FIG. 27A, which are fully engaged or sprung via their lobe springs 2110. Here, rotation 2704 of the drive screw 2002a,2002b is transmitted to the lobes 2004a,2004b through the springs 2110, and the springs 2110 may impart a rotation 2702 on the lobes 2004a,2004b to close any gap between the lobe tooth A and the tooth B of the slot 118 of the lower rail 102. In particular, the rotating drive screw 2002 acts on the spring 2110 at its least amount of applied moment (e.g., the moment decreases the further the active lobe 2004 cinches/binds on the lower rail 102). Thus, rotational movement 2704 of the drive screw 2002 will be in the direction of closing the gap between active lobe 2004 and slots 118 in the lower rail 102, thereby adding frictional drag on the system. In other words, the drive screw 2002 may be rotating in the opposite rotational direction that the lobe spring 2110 is rotationally biasing the active lobe 2004. The second spring end 2112b may be retained/engaged within a slot 2116 provided in the second end 2106 of each shaft 2104, so as the shaft 2014 traverses forward, it will attempt to push the lobe forward into contact with the opposite tooth wall (shown by 2404 in FIG. 24B) while the lobe spring 2110 simultaneously rotates the active lobe in the forward direction. Since the drive screw 2002 would be driving the active lobe 2004 into the opposite tooth wall as the lobe spring 2110 is simultaneously biasing the active lobe 2004 into contact with the opposite tooth wall, additional friction or drag on the system would be created. However, the springs 2110 may be selected with spring constants that inhibit cinching/binding of the system when the lobe tooth A is urged into contact with the slot 118 wall of the lower rail 102. Also, incorporation of the wavy washers 2120 may further inhibit cinching/binding of the system.

FIGS. 28A and 28B illustrate an example of the lobe 2004, according to one or more embodiments of the present disclosure. In the illustrated example, a rotation limiting feature 2802 is formed in the bore 2108 of the lobe 2004. Here, the rotation limiting feature 2802 is a pair of angled flats 2804,2806. As mentioned above, rotation of the lobe 2004 about the shaft 2104 is limited by the flat feature 2502 provided on the shaft 2106 of the drive screw 2002. Upon rotation of the lobe 2004 clockwise or counterclockwise, one of the angled flats 2804,2806 will contact the flat feature 2502 of the shaft 2106, thereby inhibiting further rotation in that direction; the lobe 2004 may then rotate in the opposite direction about the shaft 2104 until the other one of the angled flats 2804,2806 contacts the flat feature 2502 and inhibits further rotation in that opposite direction. In this manner, the lobe 2004 may rotate relative to the shaft 2104 to a degree depending on the angle of the angled flats 2804,2806. For example, if the angled flats 2804,2806 were provided without an angle between them, such that they extended along a horizontal H, they would define a flat surface that would constantly abut the flat feature 2502 of the shaft 2106 and thereby inhibit any rotation of the lobe 2004; however, providing the angled flats 2804,2806 at an angle relative to each other, only one of the angled flats 2804,2806 will contact the flat feature 2502 of the shaft 2106 at a given time such that the lobe 2004 may rotate in a direction until the other one of the angled flats 2804,2806 contacts the flat feature 2502 of the shaft 2106. FIG. 28B illustrates the angled flats 2804,2806 being angled at an obtuse angle that permits an amount of relative rotation between the lobe 2004 and the shaft 2104; however, the amount of relative rotation between the lobe 2004 and the shaft 2104 may be increased by reducing such angle, for example, orienting the angled flats 2804,2806 at an acute angle. Also in the illustrated example, each of the angled flats 2804,2806 is oriented at an angle relative to the horizontal H. The flat 2804 is oriented at an angle $\Phi$ relative to the horizontal H, and the 2806 is oriented at an angle V relative to the horizontal H. In the illustrated example, the angles $\Phi,\Phi'$ are each 10 degrees, such that the lobe 2004 may rotate 10 degrees about the shaft 2104 in either a clockwise or counter-clockwise direction before one of the angled flats 2804,2806 contacts the flat feature 2502 of the shaft 2104; however, different angle values may be selected to provide for more or less relative rotation as may be desirable.

FIGS. 28A and 28B also illustrate an example of how the lobe spring (not shown) may be provided within the lobe 2004. In the illustrated example, the embossment 2111 protrudes outward from a surface 2808 of the lobe 2004 to define a spring pocket 2810 within which the lobe spring may be set. When assembled, the spring 2110 may rest on the surface 2808 of the lobe 2004, with the first spring end 2112a extending through the opening 2114 in the embossment 2111.

Figure 29:
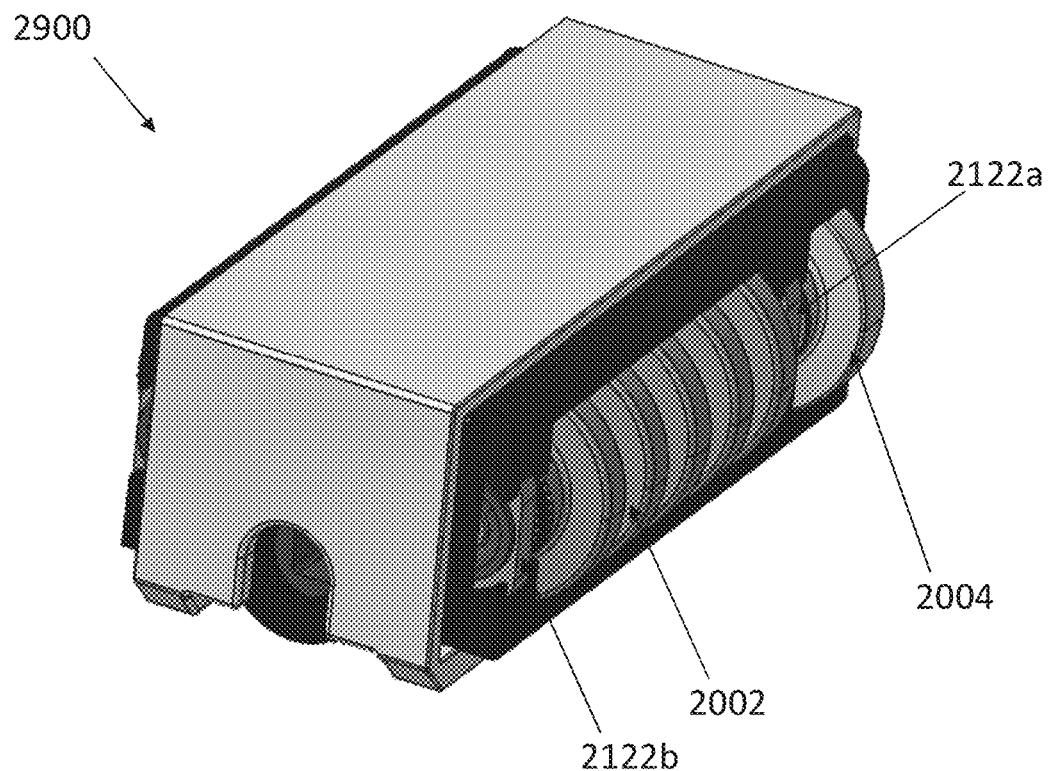
FIG. 29 illustrates an alternate gearbox utilizable to drive the seat rail assembly described herein.
Figure 30:
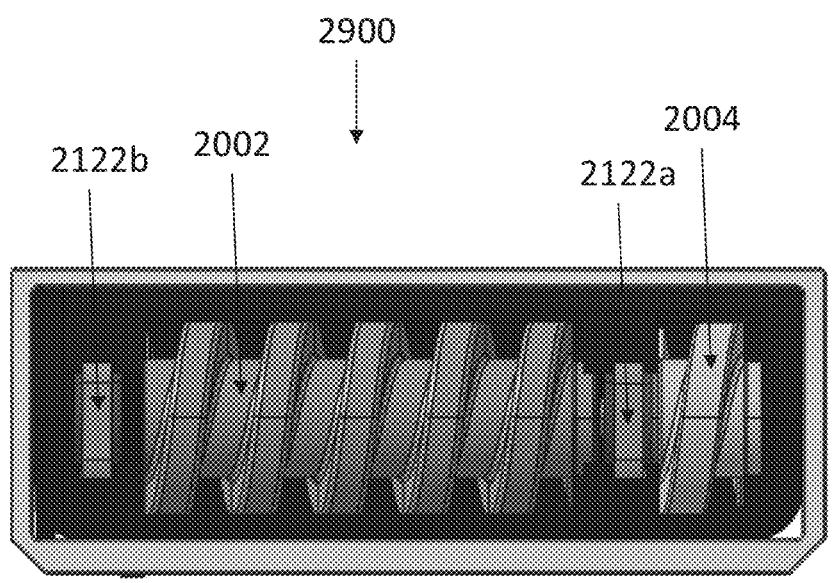
FIG. 30 is a side cross-sectional view of the gearbox of FIG. 29.
Figure 31:
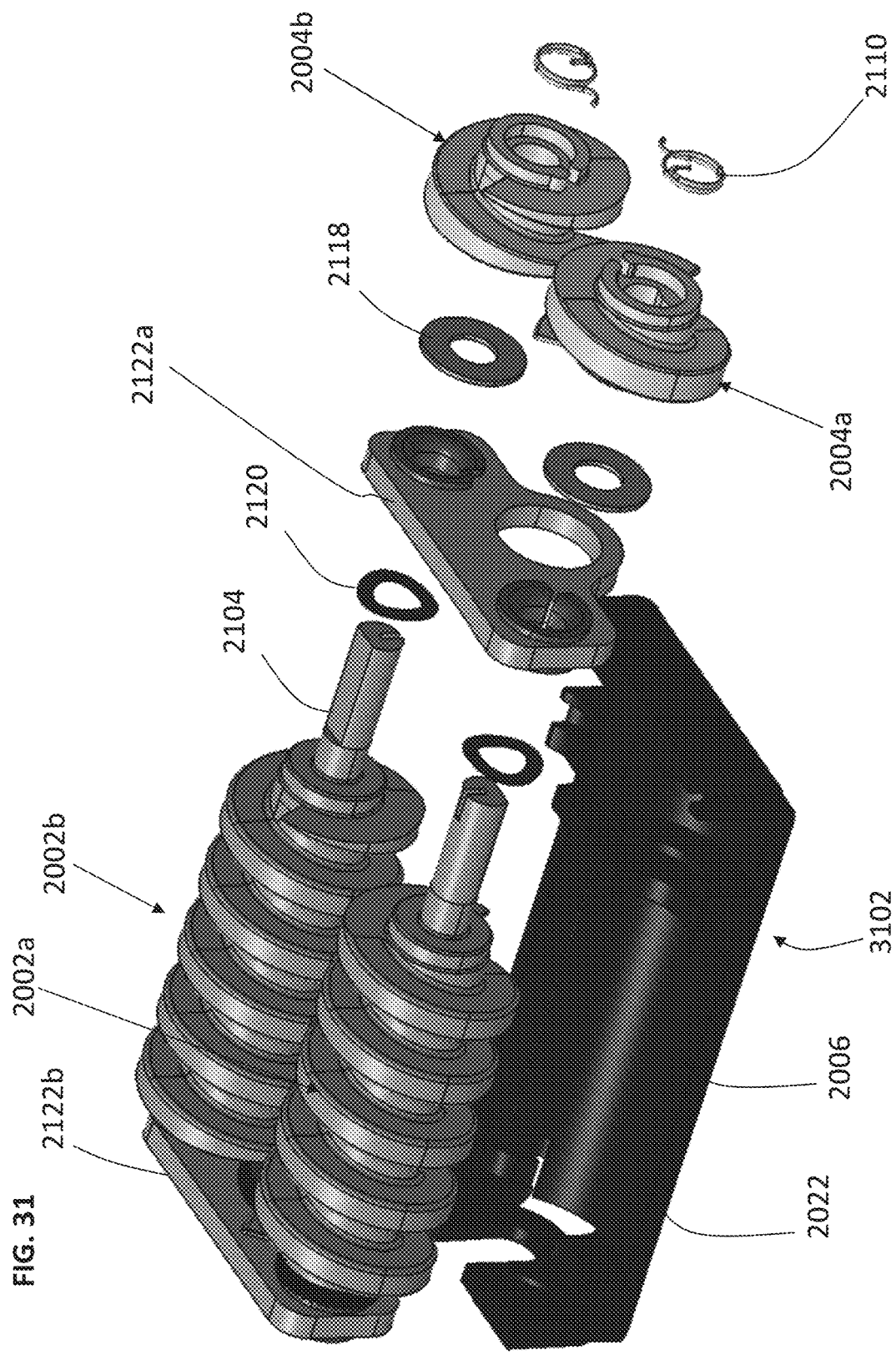
FIG. 31 illustrates a partial exploded view of the gearbox of FIG. 30.

FIG. 29 illustrates an alternate gearbox 2900 utilizable to drive the seat rail assembly described herein. The gearbox 2900 is configured to manage or eliminate backlash (i.e., lash, play, or slop) caused by gaps or clearance between the drive screw and the slots in the lower rail. Additionally, the gearbox 2900 is configured to manage or eliminate backlash caused by gaps or clearance between the drive screw and the bearing plates. FIG. 30 is a side cross-sectional view of the gearbox 2900 of FIG. 29. FIG. 31 illustrates an exploded view of the gearbox 2900 of FIG. 29. The gearbox 2900 is similar to the gearbox 2100 described above, except that the bearing plate 2122a of the alternate gearbox 2900 is positioned between the drive screw 2002 and the lobe 2004. As shown, the housing is configured to retain the bearing plate 2122a in such intermediate position between the drive screw 2002 and the lobe 2004. In the illustrated example, a slot 3102 is provided on the base section 2022 of the housing 2006 to retain the bearing plate 2122a in the desired position between the screw 2002 and the lobe 2004. While not illustrated, the upper section 2024 may include a corresponding slot feature for retaining the bearing plate 2122a in the desired position when assembled. With this design, the lobes 2004a,2004b become active lobes when subject to the biasing force of the lobe spring 2110, and, similar to the gearbox 2100 described above, the active lobes 2004a, 2004b interact directly to the shaft 2104 of the drive screw 2002a,2002b; however, because bearing plate 2122a is positioned between the lobes 2004a,2004b and the thread of their respective drive screws 2002a,2002b, the bearing plate 2122a separates the lobes 2004a,2004b from acting longitudinally on their respective drive screws 2002a,2002b.

Figure 32:
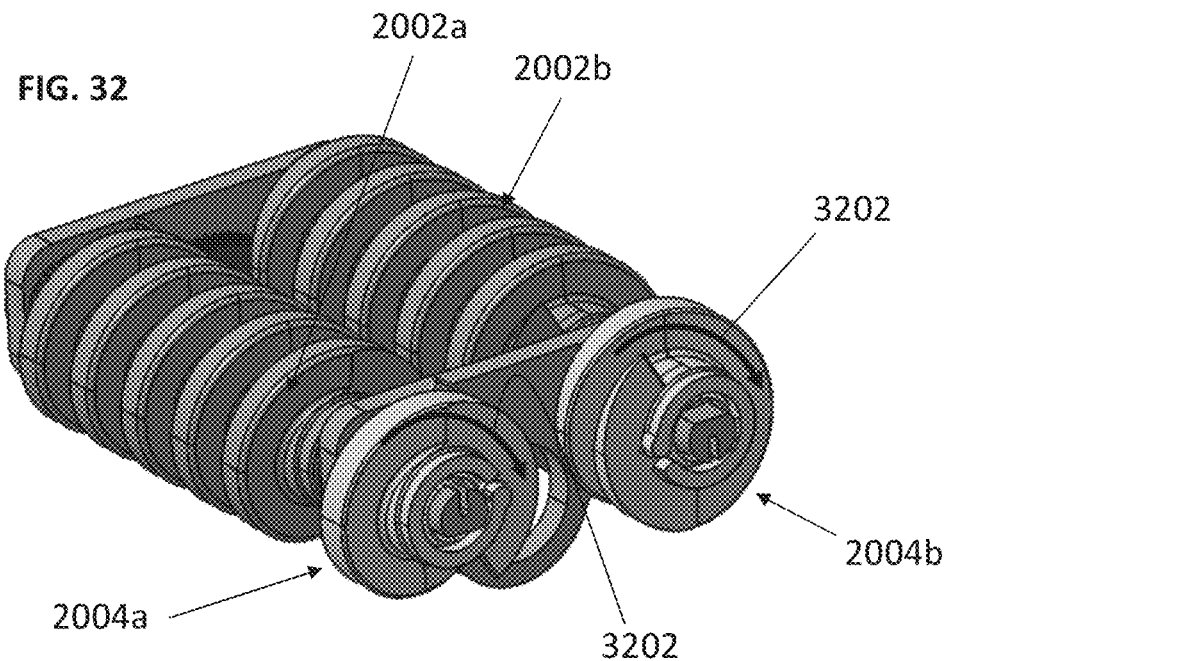
FIG. 32 illustrates an example operation of the gearbox's drive train of FIG. 31.

FIG. 32 illustrates example operation of a drive train of the gearbox 2900 of FIG. 31. In particular, FIG. 32 illustrates how each of the lobes 2004a,2004b are spring loaded via the lobe springs 2110, such that the lobes 2004a,2004b are "active" rather than just being free-floating. In the illustrated example, the lobe springs 2110 apply a clockwise torsional spring force on the lobes 2004a,2004b about their shafts 2104 as indicated by arrows 3202. The spring loaded lobes 2004a,2004b fill any clearance in the slots 118 of the lower rails 102, thereby eliminating any fore/aft slop.

Figure 33:
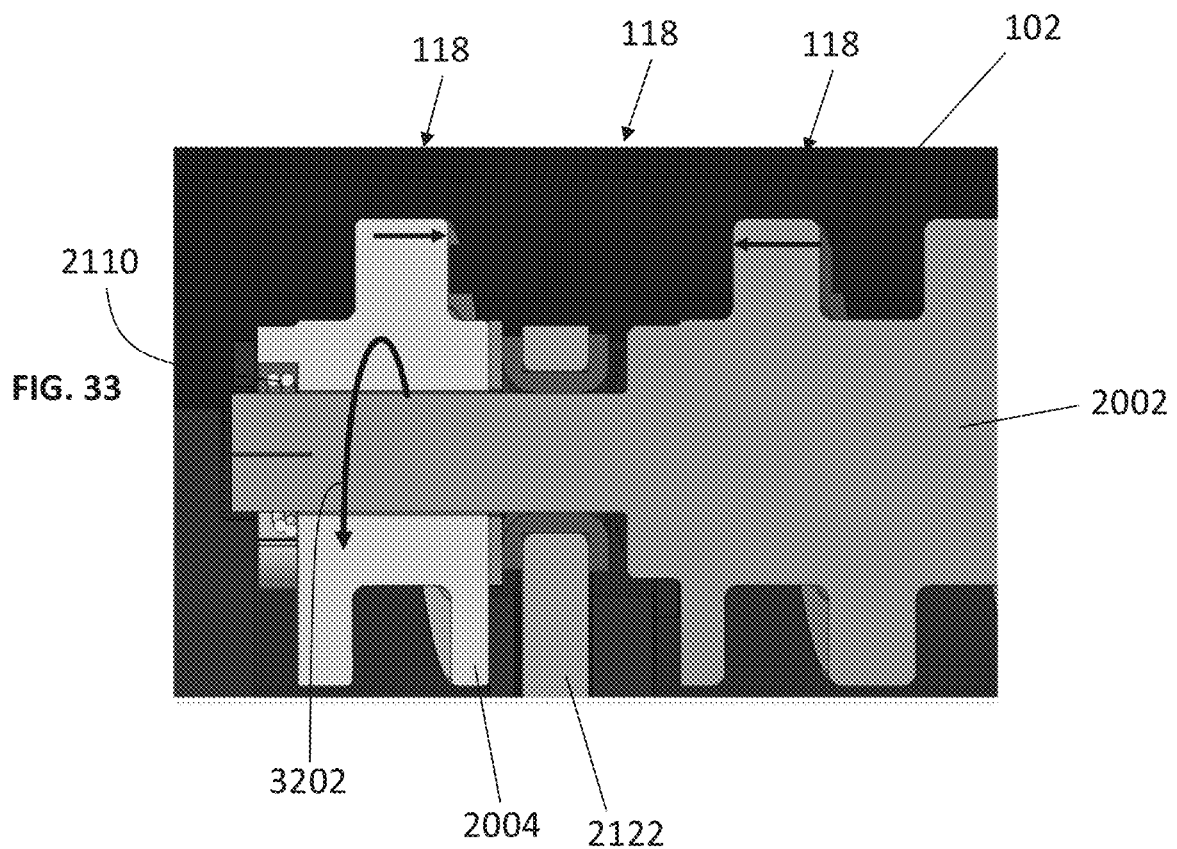
FIG. 33 is a partial cross-sectional view illustrating example operation of the gearbox of FIG. 29.

FIG. 33 is a partial cross-sectional view illustrating example operation of the gearbox 2900. With this design, the loading case with the bearing plate 2122 removes the wavy washer 2120 loading scenario described above with reference to FIG. 24B, thereby resulting in a true zero free-play design. It is possible for the gearbox 2100 to still have some longitudinal free play. As shown in FIG. 21, the gearbox 2100 includes an active lobe 2004 that is positioned between the drive screw 2002 and the bearing plate 2122a. The active lobe 2004 in this example removes longitudinal clearance between the drive screw threads 2014 and the slots 118 of the lower rail 102; however, since the bearing plates 2122a, 2022b are fixed to the gearbox 2100 housing upper cover and lower cover 2022,2024 via engagement slots 2128 and since there may be longitudinal clearance between the drive screw 2002 and bearing plates 2122a,2022b, this may result in longitudinal free play within the gearbox 2100. In other words, when the active lobe 2004 is positioned between the bearing plates 2122a,2022b, free play is removed between drive screw 2002 and lower rail slots 118, but the drive train still has the ability to longitudinally slide within the gearbox in an amount that is equal to the amount of clearance between the drive screw 2002 and the bearing plates 2122a, 2022b. Accordingly, the gearbox 2900 solves the problem of longitudinal free play that may exist or be encountered within the gearbox by positioning the bearing plate 2122a between the active lobe 2004 and the drive screw 2002. Anchoring the drivetrain assembly to one of the bearing plates (i.e., end plates) removes clearance between the drive screw and the lower rail slots 118 and also removes clearance within the gearbox assembly that otherwise would exist between the drive screw and bearing plates.

It is appreciated that a plurality of active lobes could be included in any position relative to the bearing plates and drive screw. An active lobe may be positioned outside of each bearing plate. An active lobe may be positioned inside of each bearing plate. A first active lobe may be positioned outside of a first bearing plate, and a second active lobe may be positioned inside of a second bearing plate. A first active lobe may be positioned outside of a first bearing plate, and a second active lobe may be position inside of the first bearing plate.

FIGS. 34-35 illustrate example operation of drive train within the gearbox 2900 to eliminate slop in the system. As shown in FIG. 34A, counterclockwise motor input results in clockwise rotation of the drive screws 2002a,2002b as indicated by the arrow 3402, which, in the present example, in turn results in the upper rail 104 traveling in a rearward direction along the lower rail 102. As illustrated in FIG. 34B, the rotating drive screw 2002a,2002b is acting on the spring 2110 at its least amount of applied moment (i.e., the moment decreases the further the active lobe 2004a,2004b cinches), and rotational drive screw movement will always be in the direction of cinching the gap between active lobe 2004 and the slots 118 of the lower rail 102, thereby adding frictional drag into the system. However, the system will not bind as the wavy washer 2118 within the system will compress allowing the screws 2002 to continue their traverse. With reference to FIGS. 35A and 35B, clockwise motor input through the shaft results in the drive screws 2002a,2002b rotating counter-clockwise, as indicated by arrow 3502 and the upper rail 104 traversing forward relative to the lower rail 102. As illustrated in FIG. 35B, the rotating drive screw 2002a,2002b is acting on the spring 2110 at its least amount of applied moment (e.g., the moment decreases the further the active lobe 2004a,2004b cinches), and the rotational drive screw movement will open up the gap between active lobe 2004a,2004b and the slot 118 wall of the lower rail 102 allowing system to move with little drag.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of this disclosure. Furthermore, no limitations are intended to the details of construction or design shown, other than as described in the claims below. It is therefore evident that the particular illustrative embodiments disclosed above may be altered, combined, or modified and all such variations are considered within the scope of the present disclosure. The systems and methods illustratively disclosed may be practiced in the absence of any element that is not specifically disclosed herein and/or any optional element disclosed herein. The terms in the claims have their plain, ordinary meaning unless otherwise explicitly and clearly defined by the patentee. All numeric values provided in the specification are for the specific embodiment described and may be varied as appropriate for a given application. The indefinite articles "a" or "an," as used in the claims, mean one or more than one of the elements that it introduces. If there is any conflict in the usages of a word or term in this specification and one or more patent or other documents that may be incorporated herein by reference, the definitions that are consistent with this specification should be adopted.

The use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A seat rail assembly, comprising:
a lower rail having a bottom plate section, a pair of outer plate sections extending upward from both right and left ends of the bottom plate section, upper plate sections extending from upper ends of the right and left outer plate sections to the inside in right-left direction, and inner plate sections extending downward from inner ends of the right and left upper plate sections; and
an upper rail slidingly provided on the lower rail including a pair of U-shaped side plates,
the side plates each are curved or segmented to at least partially wrap around the corresponding inner plates of the lower rail, and include a downwardly extending inner sidewall portion and an upwardly extending outer sidewall portion joined together by a bottom portion, and
lateral control features are provided in an interior surface of the U-shaped side plates to reduce rattling between the upper rail and the lower rail;
wherein each of the lateral control features is a U-shaped member including an inner wall portion, an outer wall portion, and a bottom curved wall portion joining the inner wall portion and the outer wall portion; and
wherein the lateral control feature includes a pair of outer locking tabs and an inner locking tab that engage edges of a recess formed in the upper rail.

2. The seat rail assembly of claim 1, wherein the lateral control features are mounted to the side plates of the upper rail.

3. The seat rail assembly of claim 1, wherein the inner locking tab is positioned between the pair of outer locking tabs in the longitudinal direction of the lateral control feature.

4. The seat rail assembly of claim 1, wherein one or more ribs are provided on an interior surface of the inner wall portions to contact the inner plate sections of the lower rail, the ribs are positioned below the inner locking tab and each of the ribs is longer than the inner locking tab in the longitudinal direction of the lateral control feature.

5. The seat rail assembly of claim 4, wherein the ribs are arranged side by side in the vertical direction, and each of the ribs extends in the longitudinal direction of the lateral control feature.

6. The seat rail assembly of claim 1, wherein a gearbox is attached to the upper rail and operable to drive or translate the upper rail relative to the lower rail, and the lateral control features are positioned on the end of the upper rail rather than the gearbox.

7. A seat rail assembly comprising:
a lower rail having a bottom plate section, a pair of outer plate sections extending upward from both right and left ends of the bottom plate section, upper plate sections extending from upper ends of the right and left outer plate sections to the inside in right-left direction, and inner plate sections extending downward from inner ends of the right and left upper plate sections; and
an upper rail slidingly provided on the lower rail including a pair of U-shaped side plates,
the side plates each are curved or segmented to at least partially wrap around the corresponding inner plates of the lower rail, and include a downwardly extending inner sidewall portion and an upwardly extending outer sidewall portion joined together by a bottom portion, and
lateral control features are provided in an interior surface of the U-shaped side plates to reduce rattling between the upper rail and the lower rail,
wherein a pair of spacers are coupled to the side plates of the upper rail, and the lateral control features are positioned on the end of the upper rail rather than the spacers.

8. A method for assembling a seat rail assembly, comprising:
preparing a lower rail having a bottom plate section, a pair of outer plate sections extending upward from both right and left ends of the bottom plate section, upper plate sections extending from upper ends of the right and left outer plate sections to the inside in right-left direction, and inner plate sections extending downward from inner ends of the right and left upper plate sections;
preparing an upper rail including a pair of U-shaped side plates, the side plates each being curved or segmented to at least partially wrap around the corresponding inner plates of the lower rail, and include a downwardly extending inner sidewall portion and an upwardly extending outer sidewall portion joined together by a bottom portion;
providing lateral control features in an interior surface of the U-shaped side plates; and
installing the upper rail into the lower rail slidingly and contacting the lateral control features to the inner plate sections to reduce rattling between the upper rail and the lower rail;
wherein each of the lateral control features is a U-shaped member including an inner wall portion, an outer wall portion, and a bottom curved wall portion joining the inner wall portion and the outer wall portion; and
wherein the lateral control feature includes a pair of outer locking tabs and an inner locking tab that engage edges of a recess formed in the upper rail.

9. The method for assembling a seat rail assembly of claim 8, wherein the lateral control features are mounted to the side plates of the upper rail.

10. The method for assembling a seat rail assembly of claim 8, wherein the inner locking tab is positioned between the pair of outer locking tabs in the longitudinal direction of the lateral control feature.

11. The method for assembling a seat rail assembly of claim 8, wherein one or more ribs are provided on an interior surface of the inner wall portions to contact the inner plate sections of the lower rail, the ribs are positioned below the inner locking tab and each of the ribs is longer than the inner locking tab in the longitudinal direction of the lateral control feature.

12. The method for assembling a seat rail assembly of claim 11, wherein the ribs are arranged side by side in the vertical direction, and each of the ribs extends in the longitudinal direction of the lateral control feature.

13. The method for assembling a seat rail assembly of claim 8, wherein a gearbox is attached to the upper rail and operable to drive or translate the upper rail relative to the lower rail, and the lateral control features are positioned on the end of the upper rail rather than the gearbox.

14. The method for assembling a seat rail assembly of claim 8, wherein a pair of spacers are coupled to the side plates of the upper rail, and the lateral control features are positioned on the end of the upper rail rather than the spacers.

\* \* \* \* \*